(12) United States Patent
Brissette et al.

(10) Patent No.: US 10,826,816 B2
(45) Date of Patent: Nov. 3, 2020

(54) METHOD AND SYSTEM FOR CORE NETWORK SUPPORT OF ACCESS NETWORK PROTOCOLS IN MULTI-HOMED REDUNDANCY GROUPS

(71) Applicant: Cisco Technology, Inc., San Jose, CA (US)

(72) Inventors: Patrice Brissette, Québec (CA); Ali Sajassi, San Ramon, CA (US); Mei Zhang, Cary, NC (US); Luc Andre Burdet, Québec (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/980,466

(22) Filed: May 15, 2018

(65) Prior Publication Data

US 2019/0356599 A1 Nov. 21, 2019

(51) Int. Cl.
*H04L 12/18* (2006.01)
*H04L 12/24* (2006.01)
(Continued)

(52) U.S. Cl.
CPC .............. *H04L 45/02* (2013.01); *H04L 12/18* (2013.01); *H04L 12/1836* (2013.01);
(Continued)

(58) Field of Classification Search
CPC ....... H04L 12/18; H04L 12/1836–1895; H04L 12/28; H04L 12/2801;
(Continued)

(56) References Cited

U.S. PATENT DOCUMENTS 8,804,570 B1 * 8/2014 Gupta ................... H04L 12/56
370/254
9,049,133 B2 6/2015 Boutros et al.
(Continued)

OTHER PUBLICATIONS

Brissette, Patrice et al., Bell Canada, "EVPN Multi-Homing Mechanism for Layer-2 Gateway Protocols, draft-brissette-bess-evpn-12gw-proto-00", Internet-Draft, Oct. 30, 2017—Expires: May 3, 2018, pp. 1-9.*
(Continued)

*Primary Examiner* — Timothy J Weidner
(74) *Attorney, Agent, or Firm* — Campbell Stephenson LLP

(57) ABSTRACT

In one embodiment, a method according to the present disclosure includes receiving a topology change message at a core edge node and performing a network address information removal operation. The core edge node participates in network communications with one or more access network nodes of an access network using an access network protocol. The topology change message indicates that a topology change has occurred in the access network, and the topology change message conforms to the access network protocol. The network address information removal operation removes network address information stored by the core edge node, and the network address information is used by the core edge node in participating in the network communications.

20 Claims, 14 Drawing Sheets

(51) Int. Cl.

| | | |
|---|---|---|
| *H04L 12/46* | (2006.01) | |
| *H04L 12/66* | (2006.01) | |
| *H04L 12/703* | (2013.01) | |
| *H04L 12/705* | (2013.01) | |
| *H04L 12/721* | (2013.01) | |
| *H04L 12/723* | (2013.01) | |
| *H04L 12/741* | (2013.01) | |
| *H04L 12/751* | (2013.01) | |
| *H04L 12/761* | (2013.01) | |
| *H04L 12/801* | (2013.01) | |
| *H04L 12/803* | (2013.01) | |
| *H04L 12/825* | (2013.01) | |
| *H04L 12/911* | (2013.01) | |
| *H04L 12/927* | (2013.01) | |
| *H04L 12/931* | (2013.01) | |
| *H04L 29/06* | (2006.01) | |
| *H04L 29/08* | (2006.01) | |
| *H04L 29/14* | (2006.01) | |

(52) U.S. Cl.
CPC .......... *H04L 12/46* (2013.01); *H04L 12/4641* (2013.01); *H04L 12/4675* (2013.01); *H04L 12/66* (2013.01); *H04L 41/04* (2013.01); *H04L 41/0654* (2013.01); *H04L 41/0677* (2013.01); *H04L 41/12* (2013.01); *H04L 45/16* (2013.01); *H04L 45/18* (2013.01); *H04L 45/26* (2013.01); *H04L 45/28* (2013.01); *H04L 45/50* (2013.01); *H04L 45/507* (2013.01); *H04L 45/66* (2013.01); *H04L 45/745* (2013.01); *H04L 47/10* (2013.01); *H04L 47/125* (2013.01); *H04L 47/15* (2013.01); *H04L 47/25* (2013.01); *H04L 47/806* (2013.01); *H04L 47/829* (2013.01); *H04L 49/201* (2013.01); *H04L 49/354* (2013.01); *H04L 49/65* (2013.01); *H04L 69/18* (2013.01); *H04L 69/26* (2013.01); *H04L 69/30* (2013.01); *H04L 69/32* (2013.01); *H04L 69/322* (2013.01); *H04L 69/324* (2013.01); *H04L 69/40* (2013.01)

(58) Field of Classification Search
CPC ....... H04L 12/2852–2898; H04L 12/46–4695; H04L 12/66; H04L 41/04; H04L 41/0654–12; H04L 45/02–028; H04L 45/16; H04L 45/18; H04L 45/22–32; H04L 45/38; H04L 45/50–54; H04L 45/58–586; H04L 45/64–745; H04L 47/10–127; H04L 47/15; H04L 47/24–25; H04L 47/70–829; H04L 49/20; H04L 49/201; H04L 49/35; H04L 49/354; H04L 49/65; H04L 49/70; H04L 67/14–148; H04L 67/28; H04L 67/2866–2895; H04L 69/03; H04L 69/14; H04L 69/18; H04L 69/26; H04L 69/30; H04L 69/32; H04L 69/322; H04L 69/324; H04L 69/40
See application file for complete search history.

(56) References Cited

U.S. PATENT DOCUMENTS

| | | | |
|---|---|---|---|
| 9,397,931 B1* | 7/2016 | Mohanty | H04L 45/28 370/225 |
| 9,838,310 B1* | 12/2017 | Sajassi | H04L 61/6022 370/216 |
| 9,858,150 B2 | 1/2018 | Sajassi et al. | |
| 2008/0225695 A1* | 9/2008 | Balus | H04L 12/462 370/216 |
| 2010/0128728 A1* | 5/2010 | Sun | H04L 12/4625 370/392 |
| 2010/0303081 A1* | 12/2010 | Miyabe | H04L 45/18 370/400 |
| 2012/0020206 A1* | 1/2012 | Busi | H04L 41/00 370/217 |
| 2012/0099861 A1* | 4/2012 | Zheng | H04L 45/68 398/45 |
| 2016/0134528 A1* | 5/2016 | Lin | H04L 45/66 709/238 |
| 2017/0288970 A1 | 10/2017 | Lin et al. | |

OTHER PUBLICATIONS

"Ethernet VPN (EVPN) and Provider Backbone Bridging-EVPN: Next Generation Solutions for MPLS-based Ethernet Services", Cisco Systems; Jun. 3, 2014, Document No. 1506667170386152, Downloaded: https://www.cisco.com/c/en/us/products/collateral/routers/asr-9000-series-aggregation-services-routers/whitepaper_c11-731864.html; 9 pages.

"EVPN Multihoming Overview", Juniper Networks, TechLibrary; Feb. 19, 2019, Downloaded: https://www.juniper.net/documentation/en_US/junos/topics/concept/evpn-bgp-multihoming-overview.html, 31 pages.

"VXLAN EVPN Multihoming with Cisco Nexus 9000 Series Switches", Cisco Systems, Feb. 2017, Downloaded: https://www.cisco.com/c/en/us/products/collateral/switches/nexus-9000-series-switches/white-paper-c11-738489.html#_Toc474959283, 27 pages.

Brissette, Patrice et al., Bell Canada, "EVPN Multi-Homing Mechanism for Layer-2 Gateway Protocols, draft-brissette-bess-evpn-l2gw-proto-01", Internet-Draft, Feb. 26, 2018—Expires: Aug. 30, 2018, pp. 1-10.

Murali, Sudarshan, et al., "EVPN Unifying Control Plane," Cisco Systems, Mar. 29, 2018, 46 pages.

Sajassi, Ed A. et al., Cisco, "BGP MPLS-Based Ethernet VPN," Internet Engineering Task Force (IETF), RFC: 7432, Standards Track, ISSN: 2070-1721, Feb. 2015, 56 pages.

* cited by examiner

Remote Edge Node
Configuration Process
600

METHOD AND SYSTEM FOR CORE NETWORK SUPPORT OF ACCESS NETWORK PROTOCOLS IN MULTI-HOMED REDUNDANCY GROUPS

STATEMENT UNDER 37 C.F.R. § 1.77(B)(6)

The existence of the following Internet Engineering Task Force (IETF) drafts are noted in accordance with 37 C.F.R. § 1.77(B)(6):

Brissette, P.; Sajassi, A.; Burdet, L.; Voyer, D. (Oct. 30, 2017). "EVPN Multi-Homing Mechanism for Layer-2 Gateway Protocols". draft-brissette-bess-evpn-l2gw-proto-00. IETF. <https://datatracker.ietf.org/doc/html/draft-brissette-bess-evpn-l2gw-proto-00>. Retrieved May 15, 2018.

Brissette, P.; Sajassi, A.; Burdet, L.; Voyer, D. (Feb. 26, 2018). "EVPN Multi-Homing Mechanism for Layer-2 Gateway Protocols". draft-brissette-bess-evpn-l2gw-proto-00. IETF. <https://datatracker.ietf.org/doc/html/draft-brissette-bess-evpn-l2gw-proto-01>. Retrieved May 15, 2018.

The above-listed disclosures are presented as "inventor-originated disclosures" (i.e., the subject matter in these disclosures is attributable to one or more co-inventors of the instant patent application and/or another who obtained the subject matter directly or indirectly from the one or more co-inventors of the instant patent application), and thus, the disclosure of at least one or more aspects of the invention having been made by or having originated from the one or more co-inventors of the instant patent application, are not prior art as a result of such disclosures coming within the exceptions defined in 35 U.S.C. 102(b)(1)(A) and/or 102(b)(1)(B).

TECHNICAL FIELD

The present disclosure relates generally to network communications, and more particularly methods and systems for core network support of access network protocols in multi-homed redundancy groups.

BACKGROUND

Communication networks allow network clients, such as computer systems, to exchange data with each other at ever-increasing speeds. Communication protocols define the techniques and formats that such devices use when exchanging data via the communication networks. Communication networks connect the devices over various media, such as optical, electrical, or wireless media, and/or a combination thereof. Further, such a network can include network devices that facilitate such communication. These network devices (such as switches, routers, and the like) provide, for example, routing functionality that can route data (e.g., carried in packets, datagrams, frames, or the like) from one point in the communications network to another, possibly within a larger communication network.

BRIEF DESCRIPTION OF THE DRAWINGS

The present disclosure may be better understood, and its numerous objects, features, and advantages made apparent to those skilled in the art by referencing the accompanying drawings.

Figure 1:
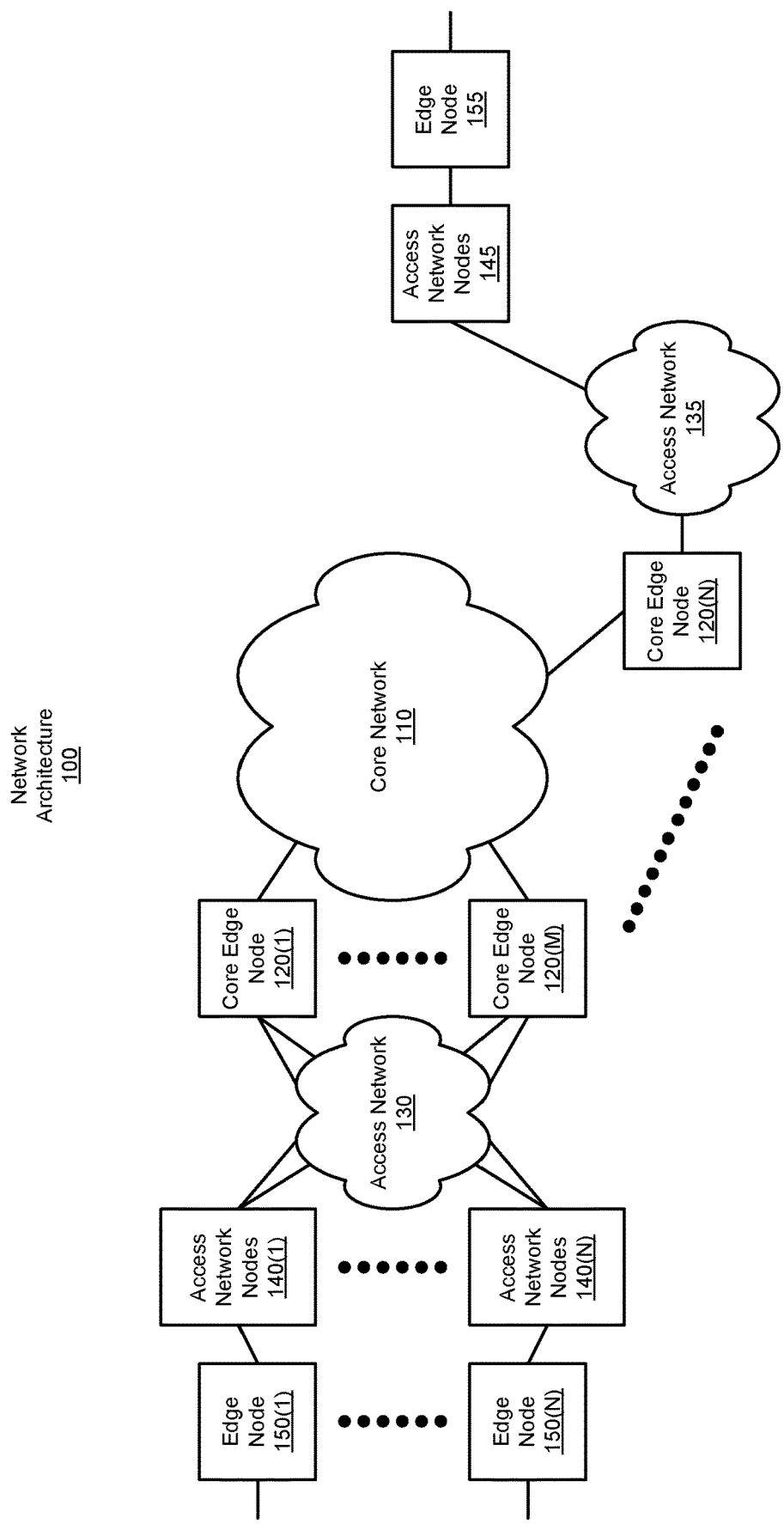
FIG. 1 is a block diagram illustrating an example of a simplified network architecture, according to one embodiment.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DESCRIPTION OF EXAMPLE EMBODIMENTS

Overview

Methods are disclosed herein that include receiving a topology change message at a core edge node and performing a network address information removal operation. The core edge node participates in network communications with one or more access network nodes of an access network using an access network protocol. The topology change message indicates that a topology change has occurred in the access network, and the topology change message conforms to the access network protocol. The network address information removal operation removes network address information stored by the core edge node, and the network address information is used by the core edge node in participating in the network communications.

Example Embodiments

Methods and systems such as those described herein provide for core network support of access network protocols in the core edge nodes of multi-homed redundancy groups and the core edge nodes with which they communicate. A multi-homed redundancy group (e.g., connecting, for example, a customer network to multiple core edge nodes by way of an access network) provides redundancy in a multi-homed access network by providing multiple connections to the core network by supporting network communications with multiple core edge nodes. In the event of a lack of connectivity to one core edge node in the redundancy group (due to failure in the access network, intentional change in topology, or the like), network communications can be rerouted dynamically through another of the redundancy group's core edge nodes.

The approaches described herein with regard to provider edge devices and their response to topology changes in an access network address shortcomings of other alternatives. Existing Ethernet virtual private network (VPN) (EVPN) multi-homing modes include the single-active mode (where only one core edge node in a redundancy group is active at a time) and the all-active mode (where all core edge nodes in a redundancy group can be active). As will be appreciated, both single-active mode and all-active mode control network communication paths through the core network, and use functionalities provided by the core network to avoid the creation of loops in the access networks coupled thereto.

In using a single-active redundancy mode, a network device (or network) is multi-homed to a group of two or more core edge nodes, and only a single core edge node in such a redundancy group can forward traffic to/from the multi-homed network device (or network) for a given virtual local area network (VLAN; a VLAN basically being a construct that allows for the logical segregation of networks without physically segregating them with various switches, while a VPN is used to connect two networks using a tunnel). Thus, in the case of single-active redundancy mode, the challenge is that, based on the designated forwarder (DF) election, only one of the core edge nodes will be forwarding traffic from access network to the core network, and vice versa (e.g., for a given Ethernet Segment of a VPN). A designated forwarder (DF) can be used when customer edge devices (CEs) are multi-homed to more than one provider edge (PE) device (core edge node). Without a designated forwarder or similar construct in a single-active scenario, multi-homed hosts could receive duplicate packets, as the result of loops and multiple paths. Designated forwarders in single-active scenarios can be chosen for an Ethernet Segment identifier (ESI) based on route advertisements.

In using an all-active redundancy mode, a network device (or network) is multi-homed to a group of two or more core edge nodes, with all (or at least, more than one) of the core edge nodes belonging to such a redundancy group forwarding network traffic to/from the multi-homed network device (or network) for a given VLAN (at least with regard to known unicast traffic; for broadcast/unknown unicast/multicast (BUM) traffic, the non-DF PE(s) drop traffic traveling from the core into the access network). Such an approach allows for load-balancing among the core edge nodes in the redundancy group.

While the foregoing redundancy modes can be employed, neither is structured to achieve the goals of implementations such as those described herein. Particularly, neither of these multi-homing mechanisms are sufficient to support access networks with gateway protocols, and more particularly, with respect to Layer 2 gateway protocols. While such Layer 2 gateway protocols need a multi-homing mechanism such as that supported by the methods and systems described herein, because at least certain of the functionalities involved in single-active and all-active modes are at odds with the needs and functionalities of such Layer 2 gateway protocols.

Figure 4:
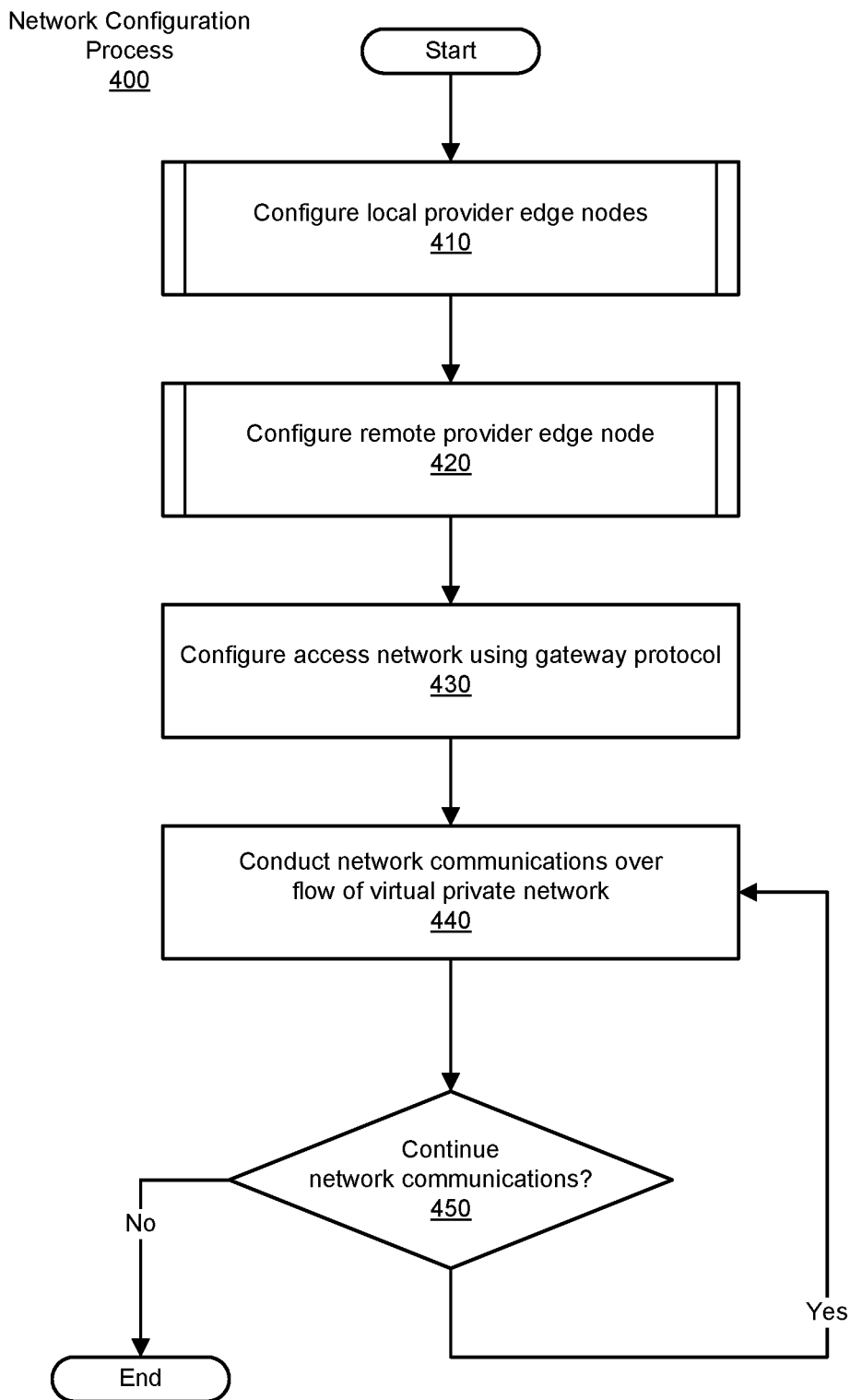
FIG. 4 is a simplified flow diagram illustrating an example of a process for network configuration, according to one embodiment.

More specifically, existing EVPN multi-homing mechanisms such as single-active and all-active are not sufficient to support access Layer 2 gateway protocols such as the Multiple Spanning Tree (MST) Access Gateway (MSTAG) protocol, the Resilient Ethernet Protocol (REP) Access Gateway (REPAG) protocol, and Ethernet Ring Protection Switching (ERPS) protocols (e.g., as is defined by the International Telecommunications Union (ITU) in various versions of G.8032), described in greater detail in connection with FIG. 4, subsequently. Layer 2 gateway protocols such as these require that a given flow of a VLAN (which can be represented by source and destination MAC address pairs {MAC-SA, MAC-DA}) only be active on one of the core edge nodes in the multi-homing group (redundancy group). This is in contrast with single-active redundancy mode where all flows of a VLAN are active on one of the multi-homing PEs and it is also in contrast with all-active redundancy mode where all Layer 2 flows of a VLAN are active on all (or more than one, at least) of the core edge nodes in the redundancy group.

To address the foregoing problems, methods and systems such as those described herein provide for a multi-homing mechanism that is referred to herein as single-flow-active. When using such a single-flow-active approach, a given VLAN is active on multiple ones of the core edge nodes in a given redundancy group (and so, is multi-homed), but a single flow of that VLAN is active on only one of the core edge nodes in the redundancy group at a given time. In fact, the scheme for network division, performed by the designated forwarder election algorithm for these Layer 2 gateway protocols, is, rather than being on a per-VLAN basis, active for each specific VLAN flow. A given core edge node in the redundancy group is thus the designated forwarder for a specific flow. Loop-prevention blocking is effected by an access node (e.g., a controlling node) in the access network (rather, as noted earlier with respect to single-active and all-active modes, assumed to be the province of the core network).

EVPN multi-homing procedures such as those described herein provide enhanced support for designated forwarder election for all traffic (both known unicast and BUM traffic) on a per-flow basis. This multi-homing mechanism also involves EVPN considerations for aliasing, mass-withdraw and fast-switchover, as described subsequently.

Example Network Topologies

FIG. 1 is a block diagram illustrating an example of a simplified network architecture, according to one embodiment. To this end, FIG. 1 depicts a network architecture 100, which supports network communications between a number of network devices via a core network (depicted in FIG. 1 as a core network 110). Core network 110 is accessed via a number of core edge nodes (depicted in FIG. 1 as core edge nodes 120(1)-(N), referred to collectively as core edge nodes 120). Core edge nodes 120 are, in turn, coupled to one or more access networks (depicted in FIG. 1 as access networks 130 and 135), which facilitate network communications through core network 110 by managing access to core network 110 by networks/network devices coupled thereto. In the example depicted in FIG. 1, various local networks/network devices (not shown) communicate with access networks 130 and 135 (and so, via core network 110, with one another) via one or more access network nodes (depicted in FIG. 1 as access network nodes 140(1)-(N) and 145), to which the local networks/network devices are coupled via edge nodes (depicted in FIG. 1 as edge nodes 150(1)-(N) and 155). In this regard, while edge nodes 150(1)-(N) and 155 are shown in FIG. 1 as being coupled to corresponding ones of access network nodes 140(1)-(N) and 145, such need not (and may well not) be the case. As will be appreciated in light of the present disclosure, in any given network topology, more than one of edge nodes 150(1)-(N) may be coupled to one of access network nodes 140(1)-(N). Further, it will also be appreciated that, by operation of access network 150 and core edge nodes 120(1)-(M), more than one of access network nodes 140(1)-(N) can be logically coupled to one of core edge nodes 120(1)-(M), as is demonstrated in certain of the subsequent figures.

Figure 2:
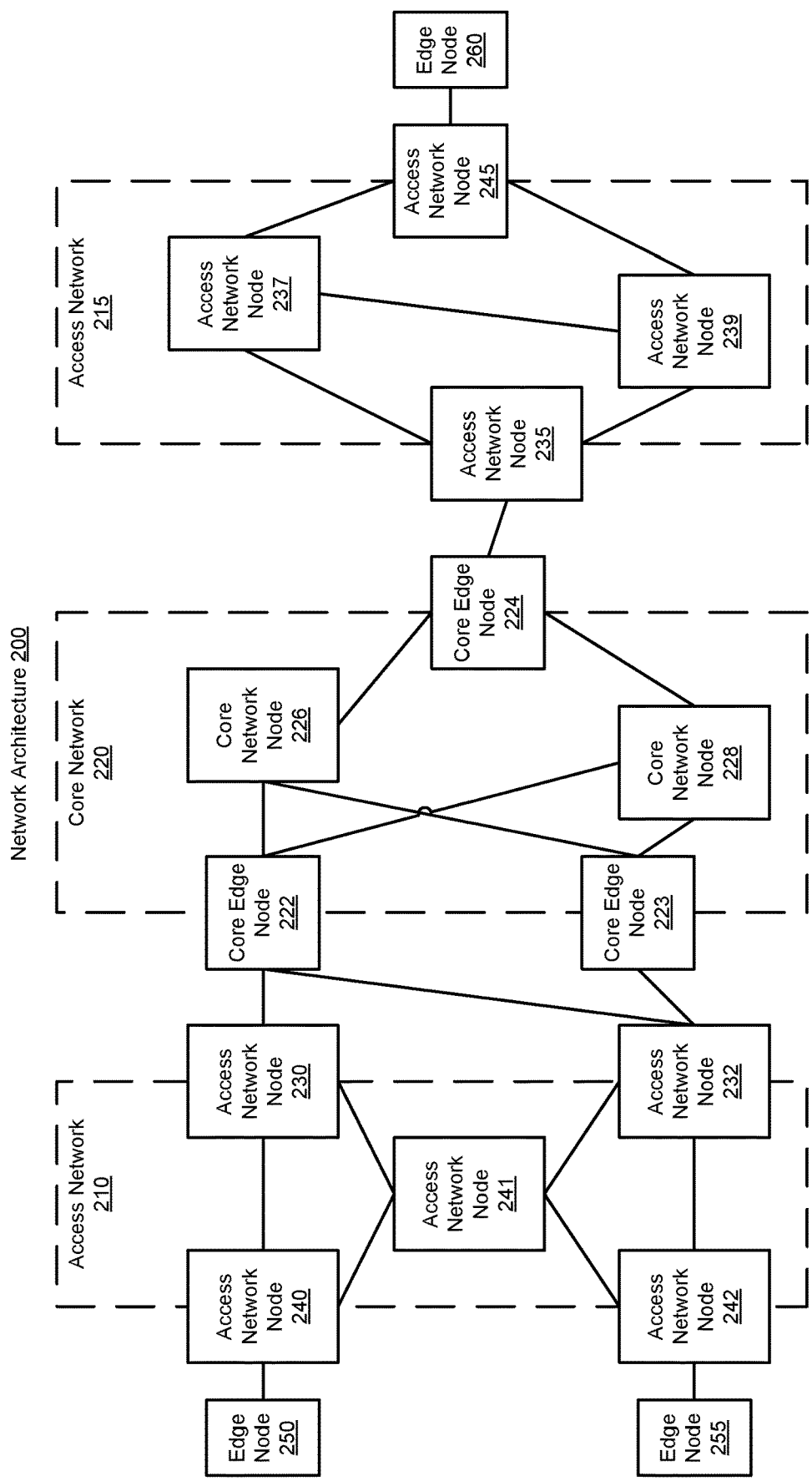
FIG. 2 is a block diagram illustrating an example of a simplified network architecture, according to one embodiment.

FIG. 2 is a block diagram illustrating an example of a simplified network architecture, according to one embodiment. FIG. 2 thus depicts a network architecture 200 in which an access network 210 and an access network 215 are coupled to one another by way of a core network 220. In the manner noted with regard to FIG. 1, network architecture 200 illustrates the logical connections between the networking devices depicted in FIG. 2. Thus, core network 220 includes a number of core edge nodes (depicted in FIG. 2 as core edge nodes 222, 223, and 224), and further includes one or more core network nodes (depicted in FIG. 2 as core network nodes 226 and 228), which are internal to core network 220. As noted, connections between ones of the core edge nodes and core network nodes of core network 220 depicted in FIG. 2 are logical in nature, and so can represent direct connections, connections via other nodes of core network 220, taken singly or in combination. Thus, the logical connections depicted in FIG. 2 within core network 220 are merely examples of such possible connections. Further, as will be appreciated in light of the present disclosure, core network 220 can include a variety of such nodes, both in interconnections and combination.

In turn, access networks 210 and 215 include access network nodes 230, 232, 235, 237, 239, 240, 241, 242, and 245, with access network 210 including access network nodes 230, 232, 240, 241, and 242, and access network 215 includes access network nodes 235, 237, 239, and 245. As with core network 220, the examples presented by access networks 210 and 215 can (and typically will) include additional internal nodes. Examples of such internal nodes are depicted in FIG. 2 as access network nodes 237, 239, and 241. Core network 220 is coupled to access networks 210 and 215 at core edge nodes 222 and 223, and core edge node 224, respectively. In this regard, core edge nodes 222 and 223 are coupled variously to access network nodes 240 and 242, while core edge node 224 is coupled to access network node 245. Here again, access network 210 (and so too, access network 215) can, and typically will include a number of access network nodes and/or access network nodes (which, in fact, need not differ from one another), coupled to one another in various ways.

Network communications between local network/network devices are supported via access networks 210 and 215, and core network 220 at various points within access networks 210 and 215. For example, with respect to access network 210, local network/network devices are coupled to access network 210 by way of edge nodes 250 and 255 (which are coupled access network nodes 240 and 242, respectively), while other local networks/network devices are coupled to access network 215 by way of an edge node 260 (which is coupled access network node 245). In being arranged/coupled in such a fashion, such access network nodes/access network nodes can support one or more logical connections. An example of such logical connections is what is referred to as a virtual private network (VPN).

In one embodiment, a network architecture such as network architecture 200 is implemented using an approach that employs Ethernet VPN (EVPN) techniques to facilitate network communications in core network 220 and access networks 210 and 215 (e.g., a VPN between edge node 250 and 260). Such an implementation employs a scalable multi-protocol label switching (MPLS) in supporting Layer 2 (of the Open Systems Interconnect model) VPN services using a multi-protocol border gateway protocol (BGP). Embodiments such as those described herein can, for example, use EVPN to aggregate internet protocol (IP) access networks over an MPLS core network, while offering Layer 2 VPN services in an end-to-end fashion. A network topology such as that depicted in FIG. 2 can be characterized as including three domains: a customer network (e.g., the edges of which could be edge nodes 250, 255, and 260), an IP access network (e.g., access networks 210 and 215), and an MPLS network (e.g., core network 220).

In such an embodiment, a customer network (e.g., by way of a customer edge (CE) device, as noted) connects to the access network in question (e.g., an internet protocol (IP) access network such as, in certain embodiments, access network 210) via a customer edge (CE) device (e.g., edge nodes 250 and 255). As noted, access network 210 includes not only one or more access network nodes (also referred to herein as ANs) to which such CEs are coupled (e.g., access network nodes 240 and 242), but also IP core nodes (IPc, such as access network nodes 237, 239, and 241). The ANs perform tunneling of Ethernet packets using an IP tunneling mechanism. In such an embodiment, the core network (MPLS network, in this example) includes provider edge nodes (PEs, such as core edge nodes 222, 223, and 224), as well as MPLS core nodes (P, such as core net work nodes 226 and 228). The PEs terminate the IP tunnels which originate from the ANs in their local IP access network (and thus form the aforementioned end-to-end (CE-to-CE) connections). Preferably, in an embodiment such as that just described, support for multipoint Layer 2 VPN services is provided that supports end-to-end (i.e. CE-to-CE) network communications, as noted. Also preferably, support for IP as well as non-IP payloads is also provided. As such, it is preferable that such methods and systems rely on media access control (MAC) learning in the data plane.

Figure 3:
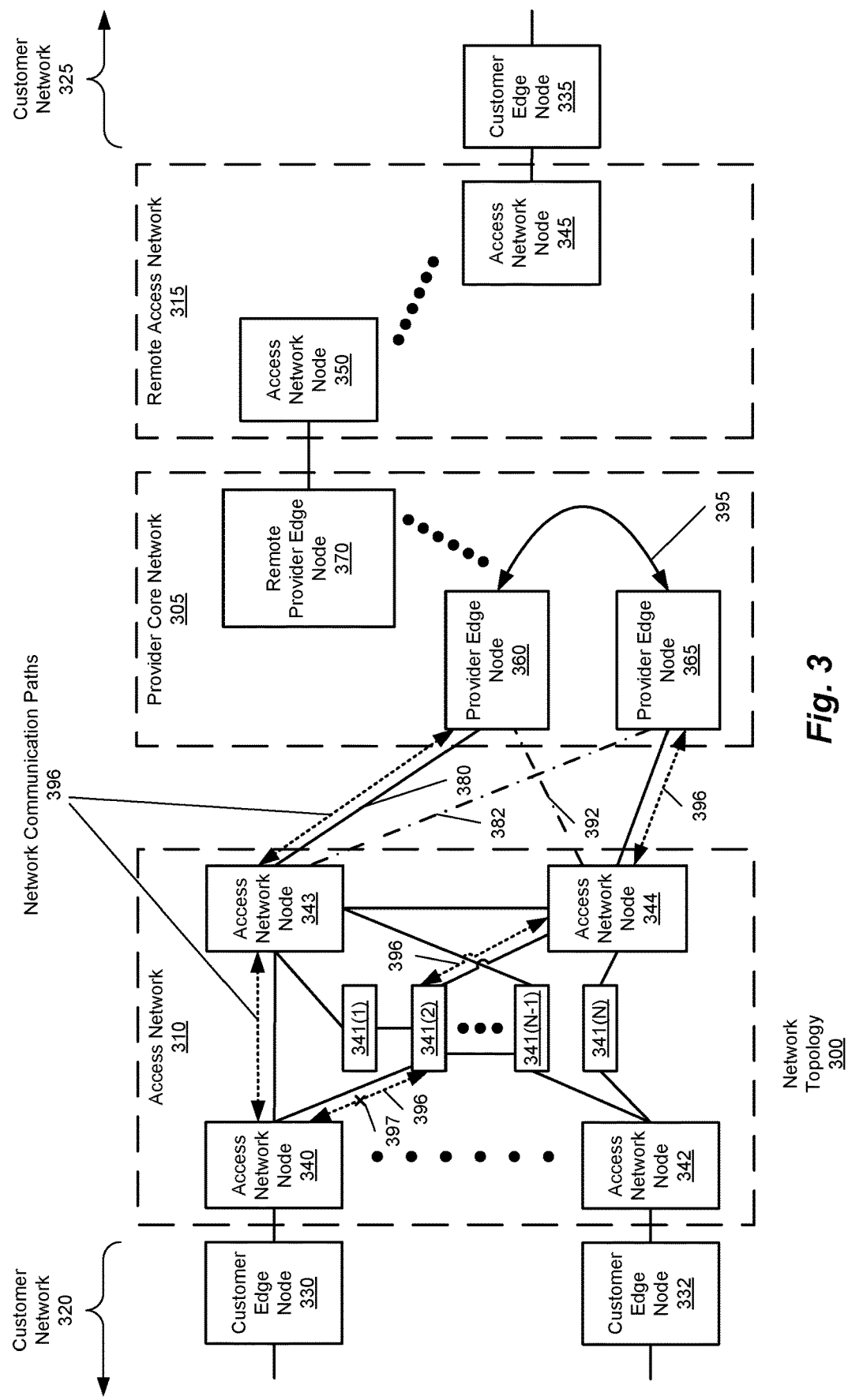
FIG. 3 is a block diagram illustrating an example of a simplified network topology, according to one embodiment.

FIG. 3 is a block diagram illustrating an example of a simplified network topology, according to one embodiment. FIG. 3 thus depicts a network topology 300, which is more conceptual in nature than the block diagrams of FIGS. 1 and 2. Network topology 300 is similar in form to network architecture 200 of FIG. 2, but illustrates an example of a more specific application of the inventive concepts described herein. That being the case, network topology 300 includes a core network (depicted in FIG. 3 as a provider core network 305), which couples two access networks (depicted in FIG. 3 as an access network 310 and remote access network 315). In a manner such as that described earlier, local networks/network devices (depicted in FIG. 3 as customer networks 320 and 325) are able to communicate with one another via provider core network 305 and access networks 310 and 315. It will be appreciated that, as used above, the relative terms "local" and "remote" are with respect to customer network 320.

As part of customer network 320, customer edge nodes (depicted in FIG. 3 as customer edge nodes 330 and 332) couple network devices within customer network 320 with access network 310. Similarly, network devices in customer network 325 are coupled to remote access network 315 by a customer edge node 335. In support of network communications between the network devices of customer network 320 and provider core network 305, access network 310 includes access network nodes 340, 341(1)-(N), 342, 343 and 344. Similarly, the network devices of customer network 325 are coupled via customer edge node 335 to remote access 315 at an access network node 345.

As noted earlier, network topology 300 is a logical representation of the communications and network devices that logically support network communications between network devices of customer networks 320 and 325. As will be appreciated in light of the present disclosure, then, the depiction of network topology 300 in FIG. 3 reflects only those elements salient to the present discussion. As will also be appreciated in light of the present disclosure, numerous and varied other communication paths, connect, network devices and other such elements are included in customer networks 320 and 325, access networks 310 and 315, and provider core network 305.

To this end, remote access network 315 includes one or more access network nodes (e.g., of which an access network node 350 is an example), which serve as examples of other such network devices in remote access network 315. In support of the aforementioned network communications, provider core network 305 includes a number of provider edge nodes (depicted in FIG. 3 as provider edge nodes 360 and 365, and a remote provider edge node 370). As noted earlier, provider core network 305 will, typically, include more network devices than simply the three provider edge nodes depicted in FIG. 3, and will also typically include a number of core network nodes internal to provider core network 305.

Also depicted in FIG. 3 are network connections between access network node 343, and provider edge nodes 360 and 365. Such network communications can be conveyed, for example, from customer edge node 330 to access network node 343 via access network node 340, and possibly one or more other access network nodes (e.g., one or more of access network nodes 341(1)-(N)). An example of network communications between access network node 343 and provider edge node 360 are depicted in FIG. 3 as a network communication path 380. Similarly, network communications between access network node 343 and provider edge node 365 are depicted as a network communication path 382.

In comparable fashion, network connections between access network node 343 and provider edge nodes 360 and 365 are also shown. Here again, such network communications can be conveyed, for example, from customer edge node 332 to access network node 344 via access network node 342, and possibly one or more other access network nodes (e.g., one or more of access network nodes 341(1)-(N)). An example of network communications between access network node 344 and provider edge node 360 are depicted in FIG. 3 as a network communication path 390. Similarly, network communications between access network node 344 and provider edge node 365 are depicted as a network communication path 392. As will be appreciated in light of the present disclosure, network communication paths 380, 382, 390, and 392 represent logical connections between access network nodes 340 and 342, and provider edge nodes 360 and 365.

In the example presented in FIG. 3, the network communications paths (e.g., network communications paths 380 and 390, and network communications paths 382 and 392) can be treated as being included in corresponding network segments (e.g., an Ethernet Segments), and the provider edge nodes (core edge nodes) can participate in the network operations of access network 310 (e.g., access network protocols in use therein). In participating in the access network protocol, a core edge node such as provider edge nodes 360 and 365 participates in network communications with one or more access network nodes (e.g., by sending and/or receiving network messages, maintaining network information such as network address information, and performing other such operations), using the access network protocol, among others. Thus, network communications paths 380 and 390 (shown in solid lines in FIG. 3) can provide connectivity for one Ethernet Segment, and network communications paths 382 and 392 (shown in dashed/dotted lines in FIG. 3) can provide connectivity for another Ethernet Segment. As noted elsewhere herein, provider edge nodes 360 and 365 are therefore able to participate in access network protocols implemented in access network 310 by way of such connectivity.

Also shown in FIG. 3 is a network communication path 395. Network communication path 395 (e.g., a pseudowire), depicted as being between provider edge nodes 360 and 365 (and which may include one or more core nodes internal to provider core network 305), can be configured as part of the process of configuring provider edge nodes such as provider edge nodes 360 and 365. Such configuration is noted in connection with FIG. 5, as described subsequently.

In the example presented in connection with FIG. 3, the network traffic is delivered to provider edge node 360 or provider edge node 365 from access network 310 for each flow. Provider edge nodes 360 and 365 encapsulate packets in the network traffic in a header, using the B-MAC address associated with the network segment (e.g., the Ethernet Segment) corresponding to the VPN on which the traffic was received. The core edge node then adds the MPLS encapsulation and forwards the packets towards the destination remote core edge node (e.g., a remote core edge node such as remote provider edge node 370). Remote provider edge node 370 learns the C-MAC against the B-MAC address associated with provider edge node 360. For network traffic in the reverse direction, remote provider edge node 370 forwards network traffic destined to that C-MAC to provider edge node 360. It will be appreciated that, in the context of a core network such as that described herein, a core edge node that is deemed "remote" is a given situation is, on a fundamental level, simply a core edge node that is not a member of the redundancy group in question (though, in fact, to be relevant, such a core edge node will provide connectivity to an access network (and so, customer edge nodes and hosts/servers communicatively coupled thereto) participating in the given VPN). As will also be appreciated, an access network node in the access network in question determines which provider edge node will receive the network traffic when an access network protocol such as a Layer 2 gateway protocol is implemented therein.

Using the elements described in connection with FIG. 3, the operation of a network with an access network running a Layer 2 gateway protocol (e.g., MSTAG, REPAG or G.8032) is now described. The Layer 2 gateway protocol starts, in certain embodiments, from an interface on provider edge node 360 facing access network 310 to an interface on provider edge node 365 facing access network 310, in an open "ring" manner. These interfaces of provider edge nodes 360 and 365 are participants in the access network protocol. Provider edge nodes 360 and 365 are peering core edge nodes in a redundancy group and, in certain embodiments, are EVLAG-capable (i.e., can implement Ethernet VPN (EVPN) multi-chassis link aggregation (EVLAG)). The Layer 2 gateway protocol used provides for loop avoidance, as noted elsewhere herein. In this example, the loop (made up of network communication paths 396) is "broken" (interrupted, by being intentionally blocked, by a failure, or as the result of some other condition (e.g., as might be related to lack of available bandwidth)) at interruption point 397 in the network communication path 396. As a result of operating in access gateway mode, provider edge nodes 360 and 365 can perform EVLAG load-balancing. Additionally, the requisite reachability between access network nodes 340 and 343, and access network nodes 341(2) and 344 can be achieved with network communication path 396 (e.g., a forwarding path) through the EVPN MPLS/IP core side (that side facing provider core network 305).

Finally, remote provider edge core 370 behaves according to EVPN rules for traffic to/from provider edge nodes 360 and 365. The peering core edge node, selected per Layer 2 flow, is chosen by the Layer 2 gateway protocol in the access network (access network 310), and so such selection is out of EVPN control. From the perspective of remote provider edge core 370, some of the Layer 2 flows coming from remote provider edge core 370 may reach access node 344 via provider edge node 365 and some of the Layer 2 flows may reach access network nodes 340 and 343 via provider edge node 360. A specific Layer 2 flow should not be sent to both peering core edge nodes (provider edge nodes 360 and 365). Therefore, aliasing need not (and, in fact, should not) be performed by remote provider edge core 370. Remote provider edge core 370 operates in a single-active fashion for each of the Layer 2 flows (thus, the term "single-flow-active" is used herein). For example, in FIG. 3, if a failure happens between access network nodes 340 and 343, the Layer 2 flow coming from access network node 350 that is destined for access network node 343 can still transit provider edge node 360, and so need not switch to provider edge node 365. In embodiments of them methods and systems described herein, remote provider edge core 370 need not be (and is not) aware of which Layer 2 flow might be affected, specifically. During the period of transition between core edge nodes (if that occurs), remote provider edge core 370 can, for example, flood network communications, until such time as unicast traffic has properly recovered.

Features provided by methods and systems such as those described herein are based on certain features. The EVPN Layer 2 gateway framework for Layer 2 gateway protocols in access gateway mode thus employs certain assumptions, in the embodiments described herein. These include:

Peering core edge nodes share the same Ethernet Segment Identifier (ESI).

The Ethernet Segment forwarding state is dictated by the Layer 2 gateway protocol.

Split-horizon filtering is not employed because Layer 2 gateway protocol already ensures there will never be loop in the access network. The forwarding between peering core edge nodes is also preserved. In FIG. 3, access network nodes 340 and 343 may need reachability with access network nodes 344. EVPN ESI-filtering is therefore disabled, and the core edge nodes will not advertise the corresponding ESI label to other core edge nodes in the redundancy group.

In a network employing the border gateway protocol (BGP), an EVPN ESI-label BGP-Extcomm (discussed subsequently) is used in support of the multi-homing mode referred to herein as single-flow-active.

Upon receiving ESI-label BGP-Extcomm with the single-flow-active load-balancing mode, the remote core edge node disables aliasing (at Layer 2 and Layer-3), disable ESI-label processing, and disable backup path programming.

The Ethernet-Segment designated forwarder (DF) election backend procedure such as per-Ethernet Segment (ES)/Ethernet Auto-Discovery (EAD) and per-EVPN Instance (EVI)/EAD route advertisement/withdraw continues to be performed. This is primarily driven by the access network protocol. For example, upon receipt of a topology change message (e.g., topology change notification), a backup EVPN designated forwarder (DF) election procedure can be triggered, in which a PE designated as a backup DF is elected to replace the original PE that had served as DF (but which is now unreachable, for the given flow).

Topology change notifications are handled as per a process such as that described in connection with FIG. 7, subsequently. In order to address rapid Layer 2 convergence requirements that may exist, topology change notification received from the Layer 2 gateway protocols is sent across the core network to perform a remote network address information removal (e.g., a MAC flush). The generation of a topology change notification is done differently based on the access protocol. In the case of certain protocol implementations (e.g., certain REPAG and G.8032 implementations), the topology change notice is generated in both directions, and thus both of the dual-homing core edge nodes receive this notification. However, with certain other implementations (e.g., certain MSTAG protocol implementations), the topology change notice is generated in only one direction, and thus only a single core edge node can receive the notification. That topology change notice is propagated to the other peering core edge nodes for local network address information removal (e.g., MAC flushing), and relaying back into the access network. Typically, in fact, core edges nodes need not (and do not) have any direct visibility on failures happening in the access network, nor as to the impact of such failures on the connectivity between customer edge devices. Hence, both peering core edge nodes perform a local address information removal (e.g., MAC flush) on corresponding interfaces.

Two options to relay the access protocol's topology change notice to a peering core edge node: in-band or out-of-band messaging. The first method is better for rapid convergence, and employs a dedicated network communication path between peering PEs. An EVPN-VPWS (pseudowire) connection can be dedicated for that purpose. The latter choice relies on a MAC flush extended community in the Ethernet Auto-discovery per EVI route. Such an approach can be slower, but has the advantage of avoiding the need for a dedicated channel between peering core edge nodes.

A local core edge node of a redundancy group will, upon receiving a TCN from the access network:

Perform a local address information removal (e.g., MAC flush) on the access-facing interfaces.

Advertise per EVI/EAD route along with a MAC-flush BGP Extended Community in order to perform a remote MAC flush and steer Layer 2 traffic to proper peering core edge node. The sequence number can be incremented by one as a flushing indication to remote core edge nodes.

MAC/IP route re-advertisement with incremented sequence number is sent when host reachability is not moving to a peering core edge node. This ensures a re-advertisement of the current network address (e.g., MAC address), which may have been flushed remotely upon reception of an address information removal advertisement (e.g., MAC Flush Extcomm). Typically, this will happen automatically, as the peering core edge node, having received the topology change notification from the access network, will perform local address information removal (e.g., MAC flush) on the corresponding interface and will re-learn that local network address information (e.g., MAC address).

When MSTAG runs as the access network protocol in the access network, a dedicated EVPN-VPWS (pseudowire) connection can be used as an in-band channel to relay topology change notifications between peering core edge nodes.

Example Processes

FIG. 4 is a simplified flow diagram illustrating an example of a process for network configuration, according to one embodiment. FIG. 4 thus depicts example operations performed in executing a network configuration process 400. Network configuration process 400 begins with the configuration of the local provider edge nodes within the given redundancy group (410). As will be appreciated, nodes in the access network, including the provider edge nodes in the redundancy group, will, in certain embodiments, be included as members of the given network segment (e.g., an Ethernet Segment of a virtual private network). Configuration of a local provider edge node is described in greater detail in connection with the process depicted in FIG. 5.

Next (or, alternatively, in parallel with such operations), one or more remote provider edge nodes are configured (420). The configuration of a remote provider edge node is described in greater detail in connection with the process depicted in FIG. 6. At this juncture, with the provider edge nodes involved having been configured, in certain embodiments, the access network (including the local provider edge nodes) can be configured using an access network protocol such as a gateway protocol (e.g., a Layer 2 gateway protocol such as the Multiple Spanning Tree (MST) Access Gateway (MSTAG) protocol, the Resilient Ethernet Protocol (REP) Access Gateway (REPAG) protocol, an Ethernet Ring Protection Switching (ERPS; such as is defined by the International Telecommunications Union (ITU) in various versions of G.8032), or the like) (430).

Protocols such as MSTAG, REPAG, and G.8032 provide support ring protection with provide fast failure detection and recovery. More specifically, the MSTAG protocol is a gateway protocol of the MST protocol, which provide both simple and full connectivity assigned to any given Virtual Local Area Network (LAN) (VLAN) throughout a bridged LAN. MST prevents loops in each spanning tree instance (MST instance (MSTI) or the common and internal spanning tree (CIST)) by selecting active and blocked paths.

Moreover, MST allows frames/packets assigned to different VLANs to follow separate paths, each based on an independent MSTI, within MST regions composed of LANs and/or MST Bridges. These regions and the other bridges and LANs are connected into a single common spanning tree (CST). With respect to the REP protocol, a ring protection protocol is provided that is designed to provide fast failure detection and recovery, and REPAG supports gateway functionality in such networks. In a access network implementing REPAG, for example, when a link failure occurs, a node in the access network sends a failure notification, so that the access network can reroute the traffic to alternate an route. Similarly, an ERPS protocol such as defined by ITU G.8032 provides protection and recovery switching for Ethernet traffic in a ring topology and also avoids the formation of loops at the Ethernet layer.

Access network protocols such as MSTAG, REPAG, and G.8032 thus provide for the control of access network topology. That being the case, core edge nodes are relieved of this responsibility, and so need not implement features to avoid the creation of loops prevented by such access network protocols (and indeed, disable some core network features, in certain implementations). However, with the need to be notified of topology changes, the core edge nodes in a redundancy group communicate such topology changes to one another using mechanisms such as pre-configured network communication paths, inter-node communication facilities of the core network, out-of-band communications, or other such mechanisms. Since not all access network protocols provide notification of topology changes to the local core edge nodes in a redundancy group affected by those topology changes, one approach to providing for inter-node communications is the use of pre-configured network communication paths. For example, for certain access network protocol implementations (e.g., MSTAG), a pseudowire can be configured, as is described in connection with FIG. 5, below. Alternatively, certain access network protocols (e.g., REPAG and G.8032) are able to rely on integrated routing and bridging (IRB), as described subsequently in connection with FIG. 7, below.

The access network nodes and core nodes having been configured, network communications can be conducted via one or more VPN flows of those supported by the access networks and core network. It will be appreciated that a given VPN will typically support multiple VPN flows (or more simply, flows), with each flow represented by its MAC source and destination addresses ({MAC-SA, MAC-DA}, as noted). Network communications continue (450) until such time as the network communications in question are concluded. As will be appreciated, changes in the relevant topology of the access network (e.g., due to failures in the access network and/or intended topology changes) may occur during such operations. It is in these scenarios that methods and systems such as those described herein can be enlisted, in order to allow a core network such as a provider network to properly support network communications with other participants in the virtual private network.

As will be appreciated in light of the present disclosure, while operations related to the configuration of network devices such as those described in connection with FIG. 4 are illustrated as being performed in a serial fashion, and in the order depicted, such need not be the case. The particular operations depicted therein, their order, and the serial nature of their presentation are merely for ease of explanation. Other such operations can be added or substituted therefor, and such operations can be also performed in parallel (in whole or in part). For example, portions of such a network communications path can be configured as such network communications progress (e.g., as a first packet from a customer edge node traverses the various networks involved).

Figure 5:
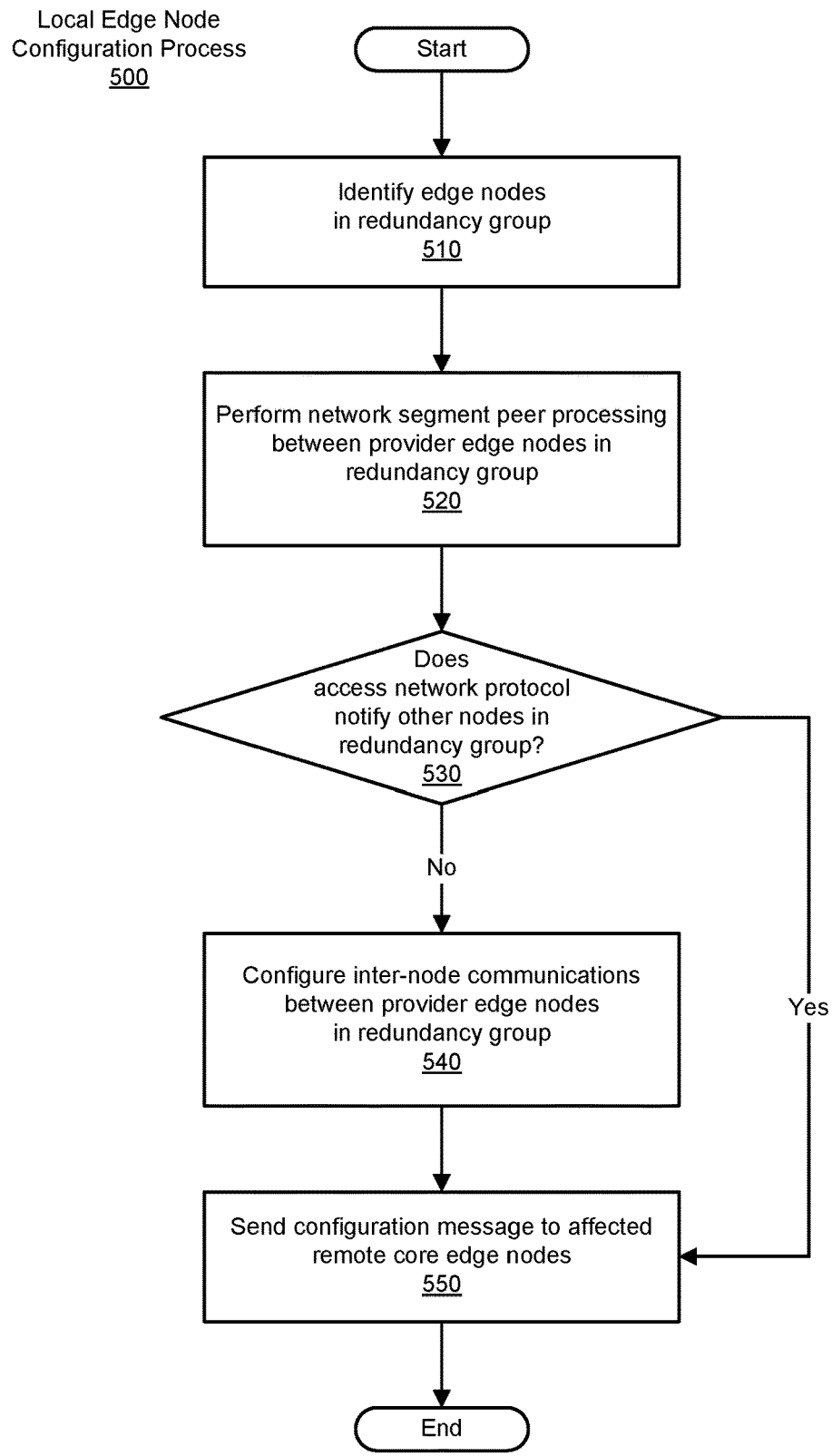
FIG. 5 is a simplified flow diagram illustrating an example of a process for local core edge node configuration, according to one embodiment.

FIG. 5 is a simplified flow diagram illustrating an example of a process for local core edge node configuration, according to one embodiment. As will be appreciated in light of the present disclosure, the processes of FIGS. 4 and 5, which are generally directed to configuring the network devices involved, sub-portions of one or more networks such as the core nodes of a core network, and the network as a whole, are performed in the context of (and substantially contemporaneously with) the configuration of local and remote core edge nodes of such a core network, as well as any configuration operations performed by core nodes internal to the core network.

FIG. 5 thus depicts example operations performed in executing a local core edge node configuration process 500. Local core edge node configuration process 500 begins with the identification of edge nodes in the given redundancy group (510). Next, network segment peer processing is performed between the provider edge nodes identified as being in the redundancy group (520). A determination is then made as to the access network protocol being used is configured to notify other nodes in redundancy group of topology changes (530). In the case in which the access network protocol does not also notify other core edge nodes in the redundancy group, inter-node communications are configured between the provider edge nodes in the redundancy group (540). Such can be the case, for example, where the access network protocol does not provide a topology change message (e.g., a topology change notification) to each provider edge node in the redundancy group. Such is the case, for example, when using a gateway protocol such as MSTAG. In such cases, inter-node communications can be implemented by configuring a network communications path (e.g., a pseudowire) between provider edge nodes in the redundancy group. A pseudowire, in certain embodiments, is an emulation of a point-to-point connection over a packet-switching network (PSN, such as a core network), which emulates the operation of a "transparent wire" carrying the service in question between core nodes such as core edge nodes (here, the communications between provider edge nodes, possibly through core nodes of the core network).

Next, local core edge node configuration process 500 proceeds with sending a configuration message to one or more remote core edge nodes, in order to apprise them of the use of the single-flow-active scheme (550). In certain embodiments, such a configuration message can take the form of a Ethernet Segment identifier label (ESI-label) extended community extension. In order to support single-flow-active mode, the ESI-label extended community can be extended to reflect the use Local core edge node configuration process 500 then concludes. As will be appreciated in light of the present disclosure, the operations depicted as making up local core edge node configuration process 500 are among other operations performed by provider edge nodes in participating in the configuration and operation of a core network such as a provider network, and more particularly, in supporting functionalities involved in a network employing Ethernet virtual private networks (EVPNs) in a provider core network, which, in turn, may employ protocols such as multiprotocol label switching (MPLS) techniques, as described earlier.

Figure 6:
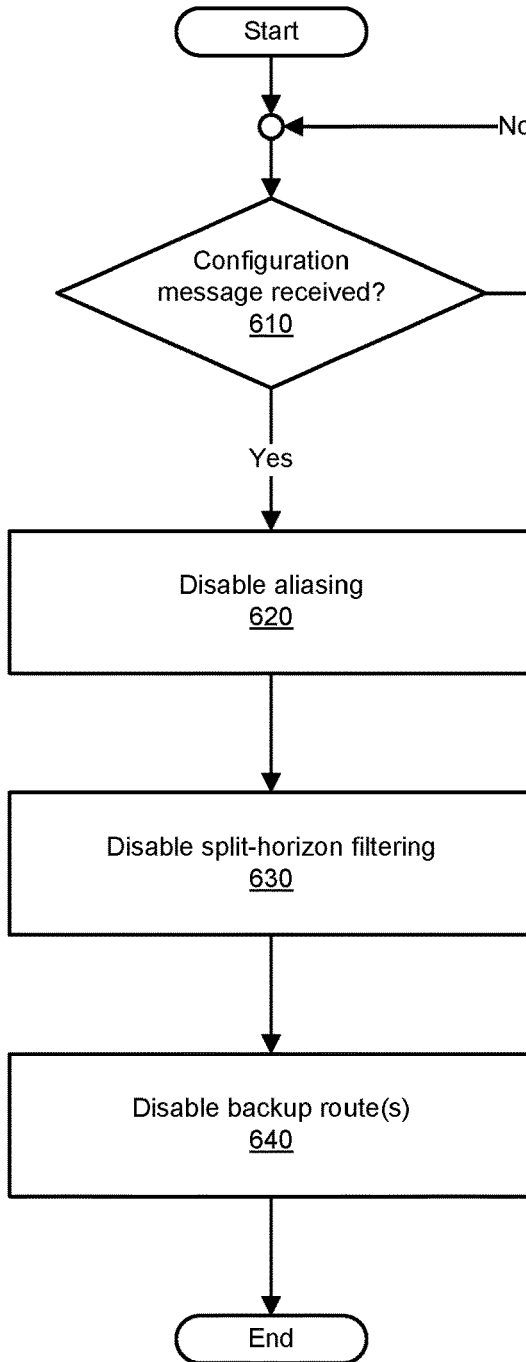
FIG. 6 is a simplified flow diagram illustrating an example of a process for remote core edge node configuration, according to one embodiment.

FIG. 6 is a simplified flow diagram illustrating an example of a process for remote core edge node configuration, according to one embodiment. FIG. 6 thus depicts example operations that can be performed in executing a remote core edge node configuration process 600. Remote core edge node configuration process 600 begins with the remote core edge node in question awaiting receipt of a configuration message (610). Such a configuration message can be the aforementioned topology change advertisement, for example.

Upon receipt of such a configuration message, the remote core edge node disables aliasing (620). Aliasing is the ability of a core edge node, such as the remote core edge node in question, to load-balance network traffic (e.g., Layer 2 unicast traffic) between core edge nodes that have same Ethernet Segment towards a given customer edge device. In such situations, while the paths to these core edge nodes may be equal cost paths (e.g., equal cost MPLS paths (ECMPs), or more generically, equal cost, multiple path), such an approach can encounter problems in methods and systems such as those described herein. For example, given that a given core edge node in a redundancy group cannot be guaranteed to have connectivity to a given customer edge node via the associated access network, allowing a remote core edge node to send the network traffic of a given flow to more than one local core edge node could potentially result in some of that network traffic being sent to a remote core edge node that is not in network communication with the requisite customer edge node. Thus, in certain embodiments, aliasing is disabled.

In performing remote core edge node configuration process 600, the remote core edge node then disables split-horizon filtering (630). Split-horizon filtering, or more generally, split-horizon route advertisement, is a method of preventing routing loops in distance-vector routing protocols by prohibiting a core edge node (e.g., a router) from advertising a route back onto the interface from which the route was learned. Methods and systems such as those described herein rely on the access network protocol employed to prevent loops in the access network (rather than the local core edge nodes and/or other core nodes), and so need not employ split-horizon filtering. Moreover, given that the access network protocol will perform the necessary blocking to prevent loops, actions by core network nodes to avoid loops (e.g., split-horizon filtering) can, in fact, result in the bisection of bridged VPNs and/or cause unreachability of one or more customer edge nodes or hosts coupled thereto.

In certain embodiments, remote core edge node configuration process 600 then disables backup route(s) (640). As noted earlier, a backup path in the present context is one that might otherwise be configured from the remote PE to another of the PEs in the redundancy group. However, switching over to such a backup path would result in all flows to the original PE being switched over, which could well be unnecessary for one or more of the flows. To avoid such a situation, the remote PE would have to be aware of the effects of a topology change in the access network on a per-flow basis, which is not the case in methods and systems such as those described herein. Thus, to prevent flows from being affected unintentionally, such backup paths are disabled. Remote core edge node configuration process 600 then concludes.

Figure 7:
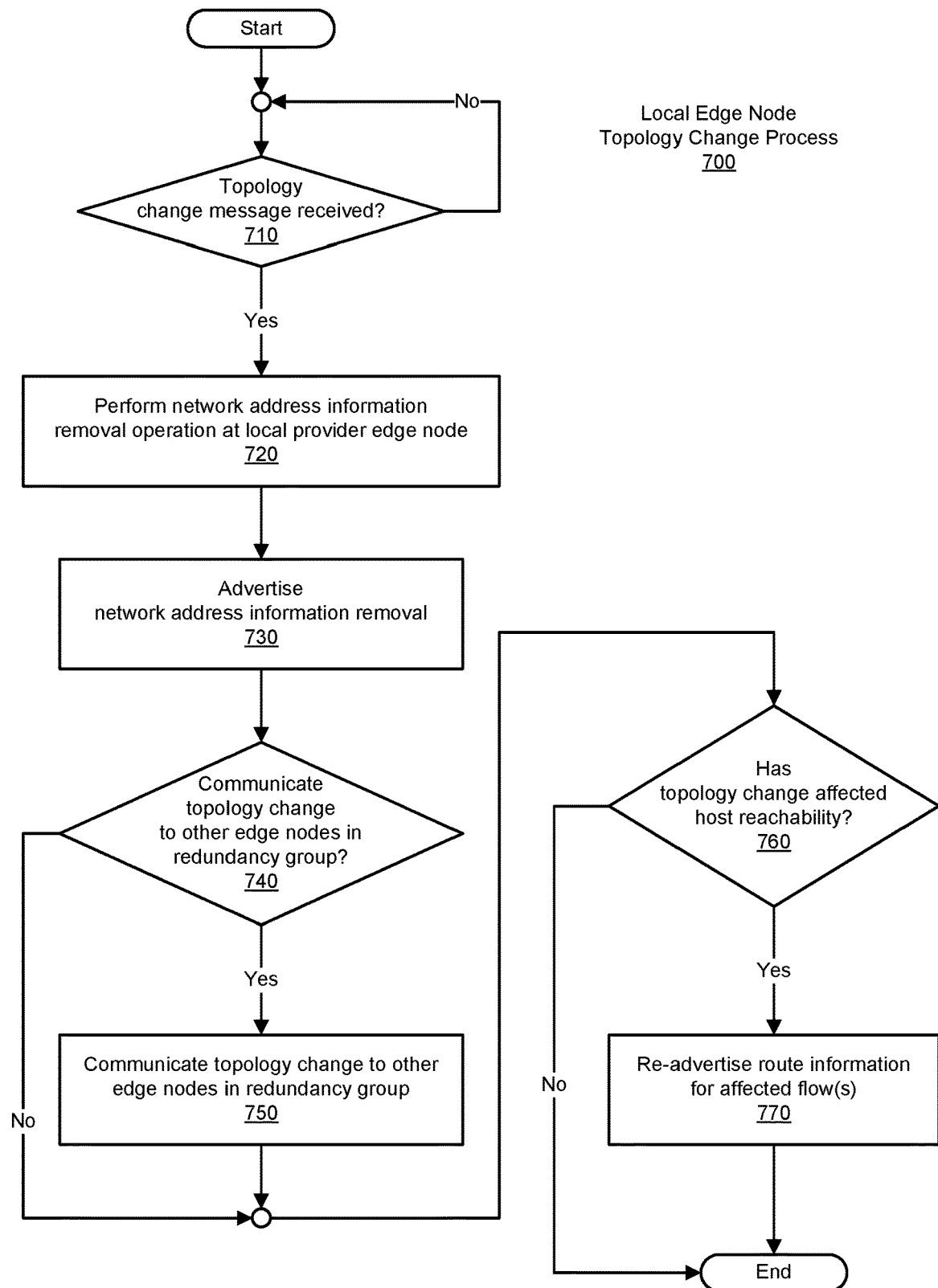
FIG. 7 is a simplified flow diagram illustrating an example of a process for local core edge node operation, according to one embodiment.

FIG. 7 is a simplified flow diagram illustrating an example of a process for local core edge node operation, according to one embodiment. FIG. 7 thus depicts example operations performed in executing a local core edge node topology change process 700. Local core edge node topology change process 700 begins with the local core edge node awaiting receipt of a topology change notice (700), a process typically performed in conjunction with other operations performed by the local core edge node in facilitating network communications in the access network, in the core network, and therebetween. Upon receipt of information regarding a topology change, such as a topology change message conforming to an access network protocol (e.g., a topology change notice, as might be received from an access network node running an access network protocol such as those noted earlier), the local core edge node will perform a network address information removal operation (720), which will remove the network information stored by the local core edge node for the affected network connections. An example of the network address information removal operation depicted in local core edge node topology change process 700 is a flush of the affected route information. More specifically, in the context of a Layer 2 gateway protocol such as those discussed earlier, a media access control (MAC) flush of the relevant forwarding information can be performed.

The local core edge node then advertises this network address information removal (730). In flushing the learned network information (e.g., MAC entries) for the affected flows and advertising the topology change, stale information can be removed from devices in the network affected by these changes. Such advertisement can be, for example, by way of a network communication such as an EVPN MAC Flush "Extcomm" (extended communities) network message. In this regard, a border gateway protocol (BGP) extended community is used by the local core edge node executing local core edge node topology change process 700, upon receipt of a topology change notice, as above. Such a network message (e.g., EVPN MAC Flush Extcomm) can be advertised, for example, along with Ethernet Auto-discovery (EAD) routes (per EVPN instance (EVI)/ EAD) upon reception of a topology change notice from the access network. When used, this extended community indicates, to remote core edge nodes that the network address information (e.g., MAC addresses) associated with that EVI/Ethernet Segment Identifier (ESI, for the Ethernet Segment in question) are "flushed" (i.e., become unresolved). These MAC addresses remain unresolved until the remote core edge node receives a route update/withdraw for those MAC addresses; the MAC route may be re-advertised by the same core edge node, or by another, in the same Ethernet Segment. In one embodiment, the sequence number used is of local significance from the originating core edge node, and is not used for comparison between peering core edge nodes. Rather, the sequence number can be used to signal via BGP successive MAC flush requests from a given core edge node.

A determination is then made as to whether the topology change (information representing the topology change) is to be communicated to other edge nodes in the redundancy group (740). In certain access network protocols (e.g., MSTAG), other edge nodes will not be apprised of certain topology changes in certain situations, and so, in such situations, other edge nodes in the given redundancy group will need to be apprised thereof. In those situations, the local core edge node in question can communicate the topology change to other edge nodes in the redundancy group (750). Such may also be the case, for example, where the topology change prevents other core edge nodes from receiving a topology change message. However, it will be appreciated that other such protocols (e.g., REPAG and G.8032) may be able to rely on integrated routing and bridging (IRB) over MPLS, as provided by the core network. Using IRB, network communications (e.g., packets) are bridged (switched) whenever the destination is within the same VLAN and are routed through these interfaces only when necessary. Whenever packets can be switched instead of routed, several layers of processing are eliminated. The switches rely on their Layer 3 capabilities of the core network to provide this basic routing between VLANs. As will be appreciated in light of the present disclosure, then, IRB can be employed to provide other core edge nodes with notice of topology changes.

One such communications have occurred (or were determined to be unnecessary), a determination is made as to whether the topology change has affected the reachability of any hosts in the affected flow(s) (760). If host reachability has changed, route information for the affected flow(s) can be re-advertised (770). At least with respect to the given VPN flow, the edge node in question can, in the alternative, forward network communications to the appropriate edge node, if a given host is no longer reachable from the edge node in question, until such time as the remote core edge node has updated its route information, and so is configured to proceed with sending network communications to the appropriate code edge node of the redundancy group (i.e., that node through which the host in question is now reachable). In either event, once completed, local core edge node topology change process 700 concludes.

Figure 8A:
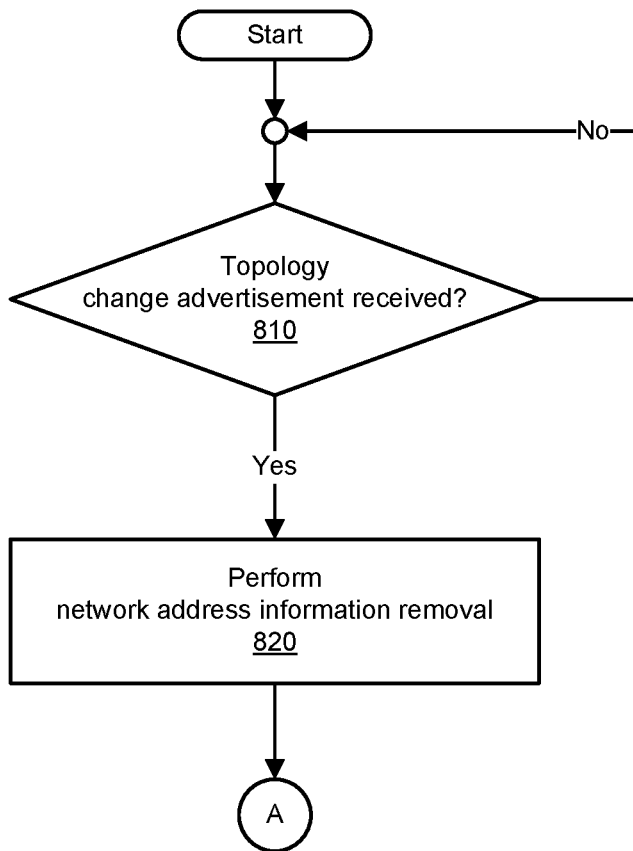
FIGS. 8A and 8B are simplified flow diagrams illustrating an example of a process for remote core edge node operation, according to one embodiment.
Figure 8B:
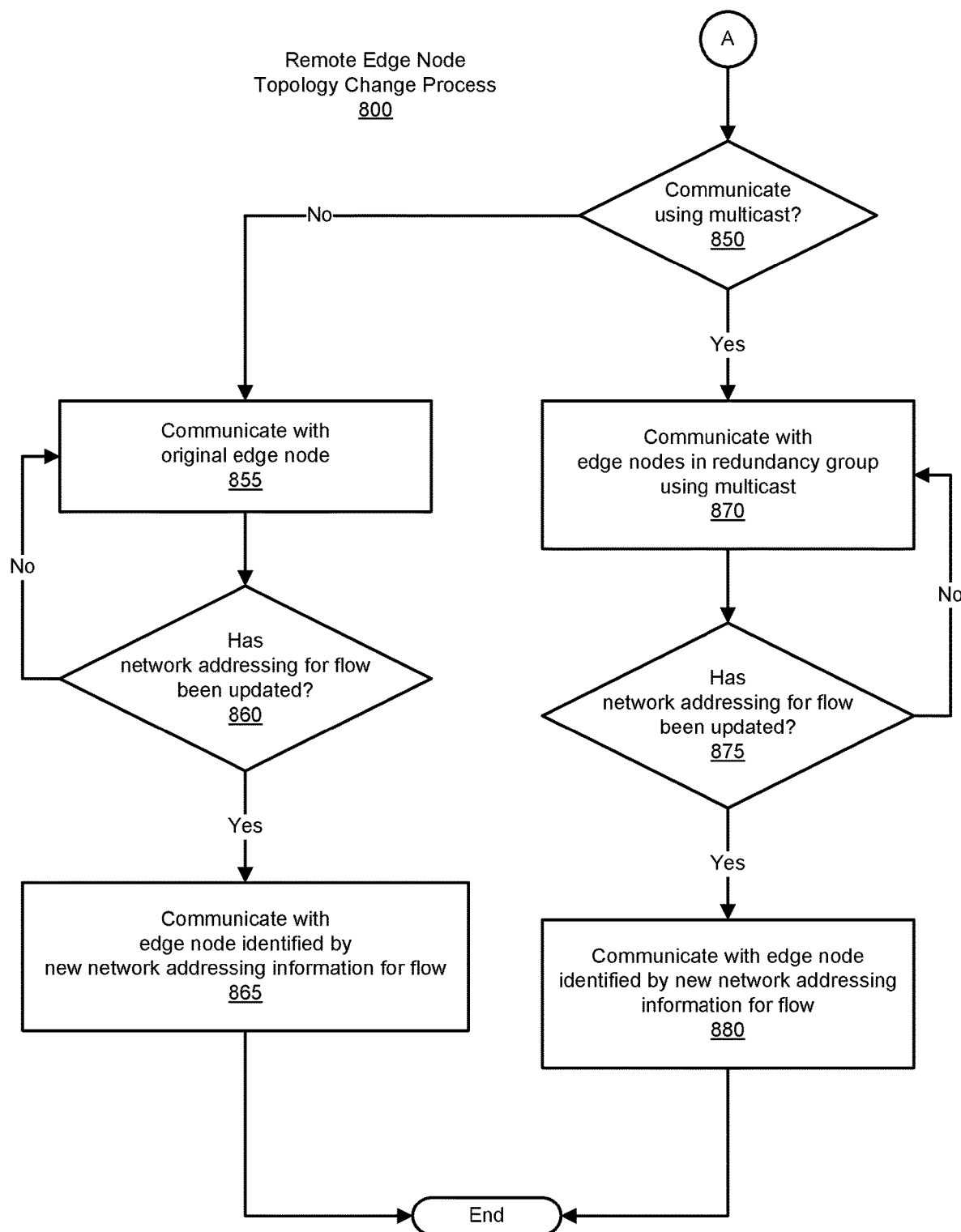

FIGS. 8A and 8B are simplified flow diagrams illustrating an example of a process for remote core edge node operation, according to one embodiment. FIGS. 8A and 8B thus depict example operations performed in executing a remote core edge node topology change process 800, which are typically performed among other operations performed by a remote core edge node during network communications supported by the remote core edge node in providing network communications to the access network nodes coupled thereto.

In performing remote core edge node topology change process 800, the remote core edge node awaits the receipt of a topology change advertisement (810). Upon receipt of a topology change advertisement, the remote core edge node performs a network address information removal operation (820). As with the operations performed in such a situation by a local core edge node, a remote core edge node performing a network address information removal can, for example, flush network addressing information associated with one or more flows, and so force the relearning of route information for flows affected by a failure or intended topology change within an access network (e.g., in an implementation employing a Layer 2 gateway protocol, such an operation being implemented as a MAC flush operation, for example). Remote core edge node topology change process 800 then proceeds to the remainder of remote core edge node topology change process 800 depicted in FIG. 8B (via connector A).

As is depicted in FIG. 8B (via connector A of FIGS. 8A and 8B), a determination is made as to whether the remote core edge node should use multicast (e.g., to multiple edge nodes in the redundancy group in question) to perform network communications (850). If a determination is made that multicast network communications will not be used, the remote core edge node in question can continue with network communication to the original edge node (855), until such time as the network addressing for the flow in question has been updated (860). Once the network addressing for the flow in question has been updated, the remote core edge node can communicate with the (new) edge node identified by the new network address for the flow (865). The process of network communications thus proceeds, and remote core edge node topology change process 800 can conclude.

Alternatively, if a multicast approach is to be used (at least temporarily), the remote core edge node employs such a multicast approach in performing network communications with the edge nodes in the redundancy group (870), until such time as the relevant network addressing (for the flow of the VPN in question) has been updated (875). It will be appreciated that, if such a multicast approach is employed, only one of the core edge nodes in the redundancy group should communicate the network communications for a given flow into the access network (and so to the intended customer edge node and host). Such an alternative results in the need for the local core edge nodes to make a determination as to connectivity, based on the network address information, which requires appropriate modification of local edge node topology change process 700 and the network communication operations performed by the local core edge nodes in the redundancy group (and indeed, any core edge nodes expected to support network communications in this manner). Once network addressing for the flow in question has been updated, the remote core edge node can communicate with the edge node identified by the new network addressing for the flow (880). As before, these network communications can now proceed as described, with remote core edge node topology change process 800 concluding.

Example Scenarios of Network Topology Changes

Figure 9A:
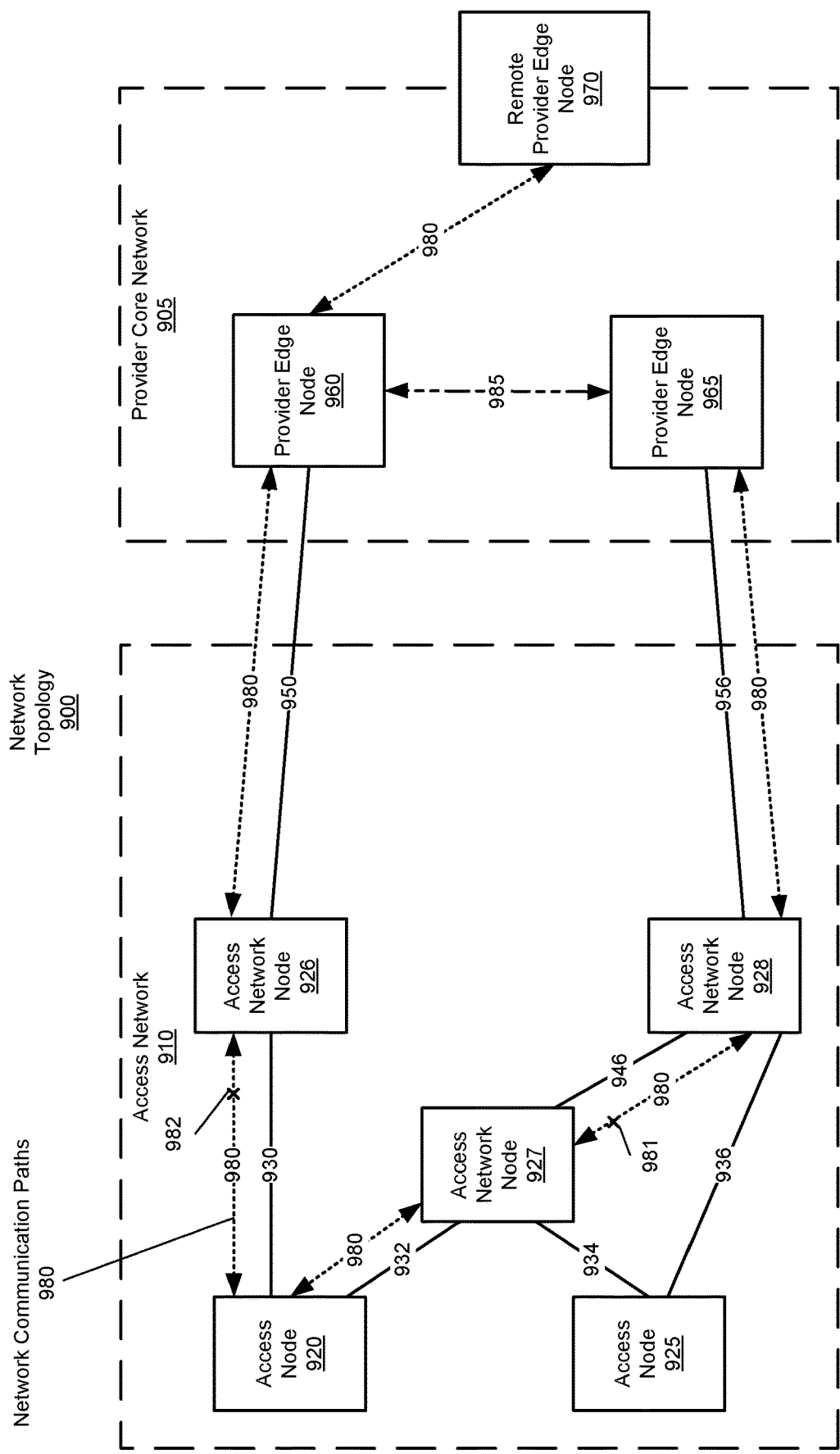
FIG. 9A is a block diagram illustrating an example of various operational scenarios in a simplified network topology, according to one embodiment.

FIG. 9A is a block diagram illustrating an example of a simplified network topology, according to one embodiment. FIG. 9A thus illustrates a network topology 900, which is comparable to the examples described elsewhere herein, although simplified for ease of description. Network topology 900 includes a provider core network 905 and an access network 910. In turn, access network 910 includes access network nodes 920 and 925, as well as access network nodes 926, 927, and 928. Linking access network nodes 920 and 925, and access network nodes 926, 927, and 928 are network connections 930, 932, 934, and 936. Linking access network nodes 927 and 928 to one another is a network connections 946. Linking access network nodes 926 and 928 to provider core network 905 are network connections 950 and 956. Provider core network 905, in supporting the aforementioned network communications, includes provider edge nodes 960 and 965, as well as a remote provider edge node 970. In the manner observed earlier, network topology 900 depicts only those network devices salient to the following discussions.

As noted, a number of scenarios (the result of, e.g., intentional topology configurations, failure scenarios, dynamic and/or static operating constraints, and the like) can be managed by methods and systems such as those described herein, in a network topology such as network topology 900. For example, an access network node such as access network node 927 can be in control of (be the controlling node for) an access network protocol in access network 910. In one scenario, access network node 927 can determine that a network communications path 980 is blocked at network connection 946 (as reflected by a path break 981). In so doing, access network node 927 prevents the formation of a network loop.

However, a link failure in access network 910 can result in the need to perform a re-determination of the network connections being managed. For link or node failures in the access network (e.g., a failure of network connection 930), which do not cause access network nodes 920 and 925 to completely lose connectivity to provider edge nodes 930 and 935, the failure triggers the gateway protocol (e.g., a Layer 2 gateway protocol such as one of MSTAG, REPAG or G.8032) to re-evaluate the connectivity within access network 910. This will cause the network traffic from some access network nodes to be steered towards different access network nodes. For example, access network node 927 can, in such a situation, unblock network connection 946, and so maintain connectivity of customer devices in network communication via access network node 920.

In such a scenario, provider edge node 960 will receive a topology change message (e.g., topology change notice) via, e.g., network connection 950. In response to receipt of such a topology change message, provider edge node 960 can follow a process such as local edge node topology change process 700 of FIG. 7, according to which provider edge node 960 performs a network address information removal operation (e.g., MAC flush) and advertises such in provider core network 905. If the Layer 2 gateway protocol does not provide for notification to other provider edge nodes in the redundancy group (e.g., provider edge node 965) or the topology change prevents receipt of a topology change message by other such provider edge nodes, provider edge node 960 can communicate notification of the topology change with other provider edge nodes in the redundancy group. Such a network communication path is depicted in FIG. 9 as a network communication path 985. Network communication path 985 can be implemented using, for example, a pseudowire, as noted elsewhere herein.

The advertisement of the network address information removal operation performed by provider edge node 960 is received by remote provider edge node 970. In turn, following remote edge node topology change process 800, remote provider edge node 970 performs its own network address information removal operation. Remote provider edge node 970 can also make determinations as to whether to communicate with the original provider edge node (e.g., provider edge node 960) or flood network communications until new addressing information has been learned.

Figure 9B:
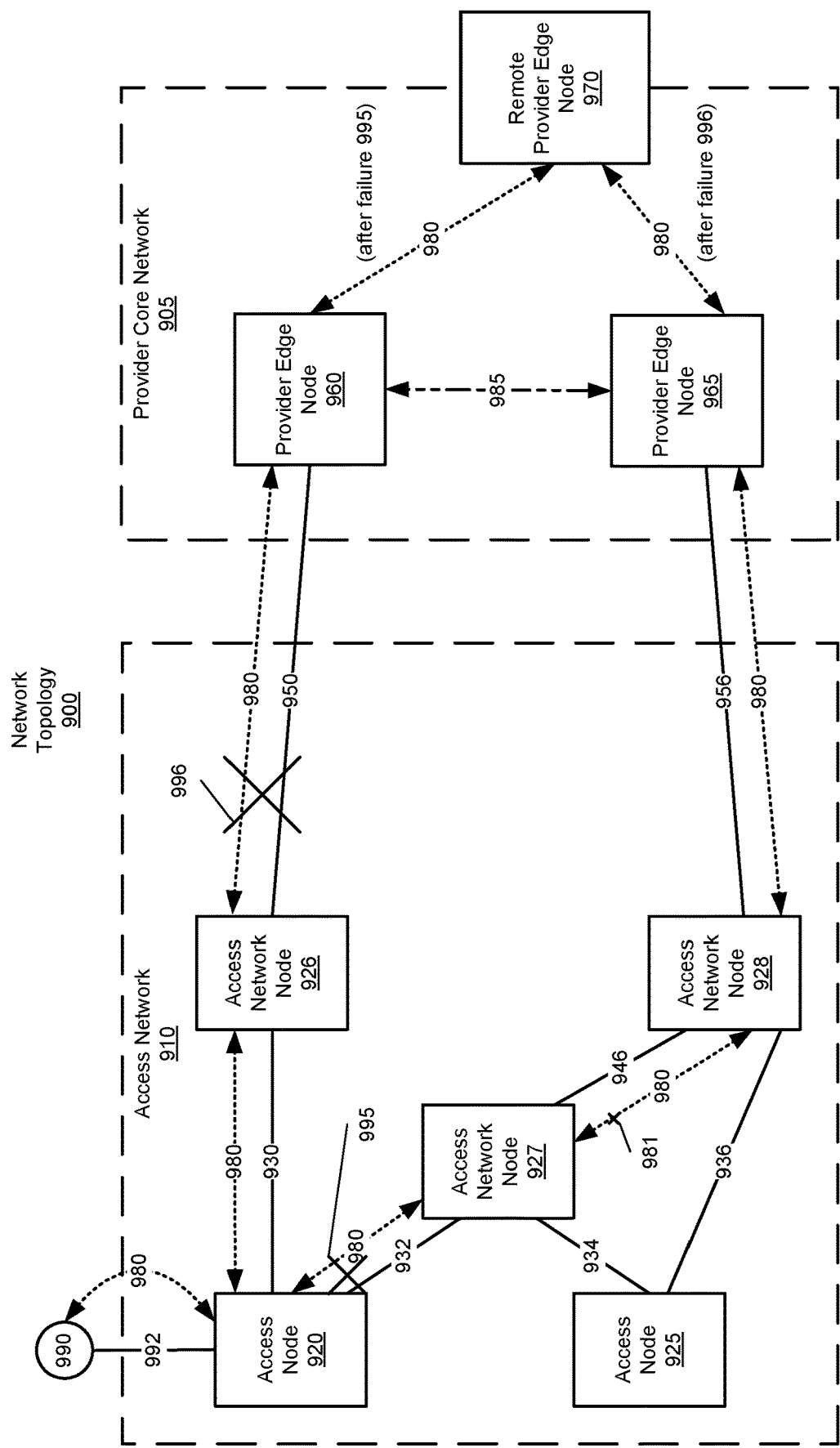
FIG. 9B is a block diagram illustrating an example of various failure scenarios in a simplified network topology such as that depicted in FIG. 9A, according to one embodiment.

FIG. 9B is a block diagram illustrating an example of various failure scenarios in a simplified network topology such as that depicted in FIG. 9A, according to one embodiment. FIG. 9B again illustrates network topology 900, which is comparable to the examples described elsewhere herein, although simplified once again for ease of description.

FIG. 9B depicts a failure scenario in which the topology of access network 910 begins in the same original topology of FIG. 9A, with access network node 927 causing network communications path 980 to be blocked at network connection 946 (at a point in access network 910 depicted as path break 981). Subsequently, however, a failure 995 occurs. As before, access network node 927 unblocks network connection 946 (removing path break 981). As before, provider edge nodes 960 and 965, and remote provider edge node 970 perform processes such as those described herein. As will be appreciated in light of FIG. 9B, with respect to network communications path 980, network communications with a host 990 coupled to access node 920 of access network 910 is unaffected by this change, and there is no need to alter network communications between provider edge node 960 and remote provider edge node 970.

However, another scenario is depicted in which a failure 996 occurs. Here again, access network node 927 unblocks network connection 946 (removing path break 981). Unlike the aforementioned scenario, however, provider edge node 960 is no longer able to communicate with host 990 by way of access network 910. In such a case of host unreachability, the topology change message causes provider edge nodes 960 and 965 to perform a network address information removal operation (e.g., a mass MAC withdrawal), as will remote provider edge node 970. At this juncture, remote provider edge node 970 can, for example, continue to send existing flows to provider edge node 960, which can, in turn, send such traffic via network communication path 985 (e.g., a pseudowire). Alternatively, remote provider edge node 970 can flood such traffic (or multicast the traffic to the provider edge nodes of the given redundancy group).

Example Computing Device and Network Environment

As shown above, the systems described herein can be implemented using a variety of computer systems and networks. Examples of such computing and network environments are described below with reference to FIGS. 10 and 11.

Figure 10:
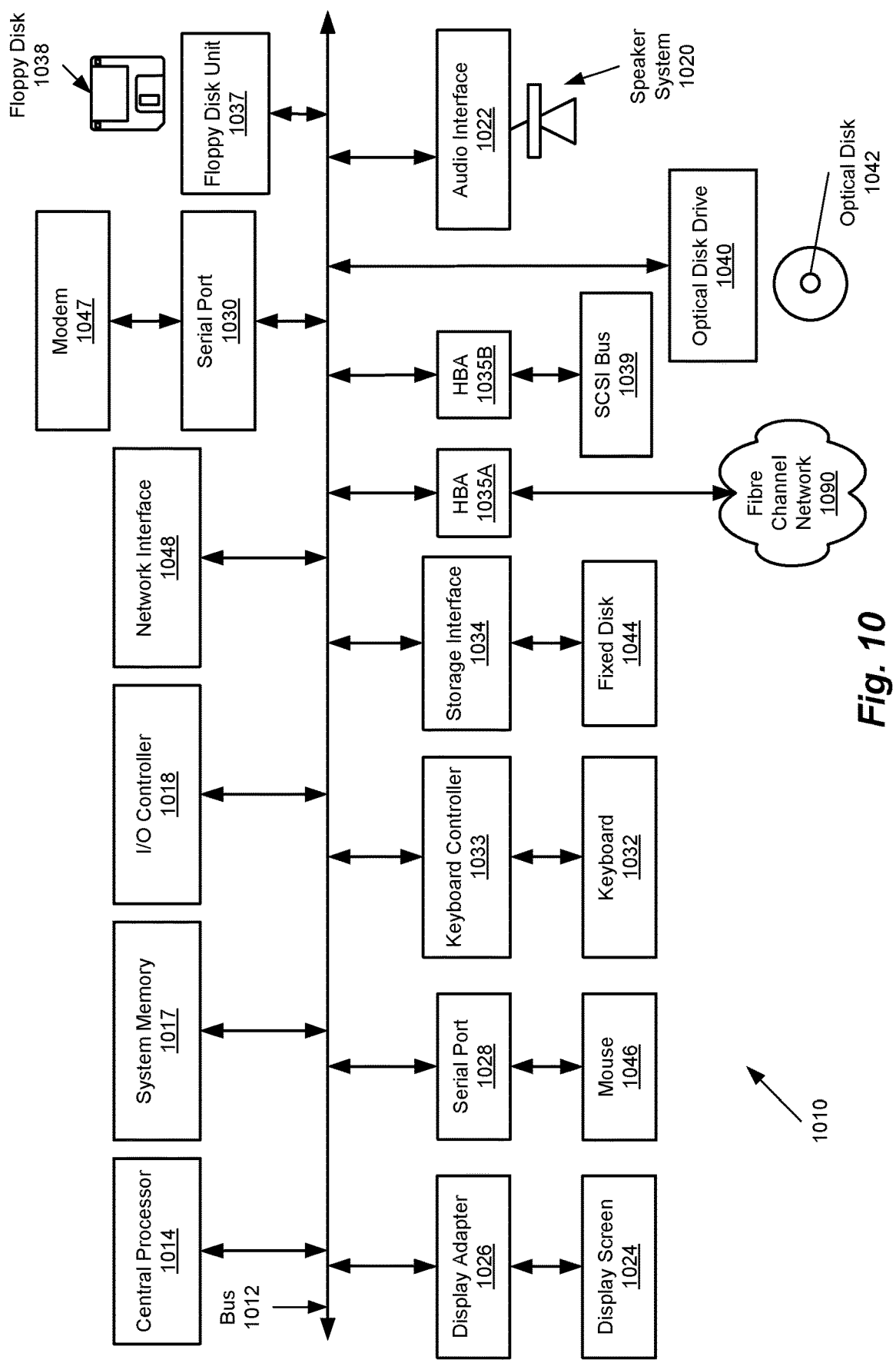
FIG. 10 is a simplified block diagram illustrating components of an example computer system, which can be used in the implementation of embodiments such as those described herein.

FIG. 10 depicts a block diagram of a computer system 1010 suitable for implementing aspects of the systems described herein, and the like. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows a network communication between central processor 1014 and system memory 1017, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1010 are generally stored on and accessed from a computer-readable storage medium, such as a hard disk drive (e.g., fixed disk 1044), an optical drive (e.g., optical drive 1040), a floppy disk unit 1037, or other computer-readable storage medium.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the systems described herein. The devices and subsystems can be interconnected in different ways from that shown in FIG. 10. The operation of a computer system such as that shown in FIG. 10 is readily known in the art and is not discussed in detail in this application. Code to implement the modules of the systems described herein can be stored in computer-readable storage media such as one or more of system memory 1017, fixed disk 1044, optical disk 1042, or floppy disk 1038. The operating system provided on computer system 1010 may be MS-WINDOWS®, UNIX®, Linux®, or other operating system.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application. Code to implement the present invention may be stored in computer-readable storage media such as one or more of system memory 1016, fixed disk 1044, CD-ROM 1042, or floppy disk 1038. Additionally, computer system 1010 may be any kind of computing device, and so includes personal data assistants (PDAs), network appliance, X-window terminal or other such computing device. Computer system 1010 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
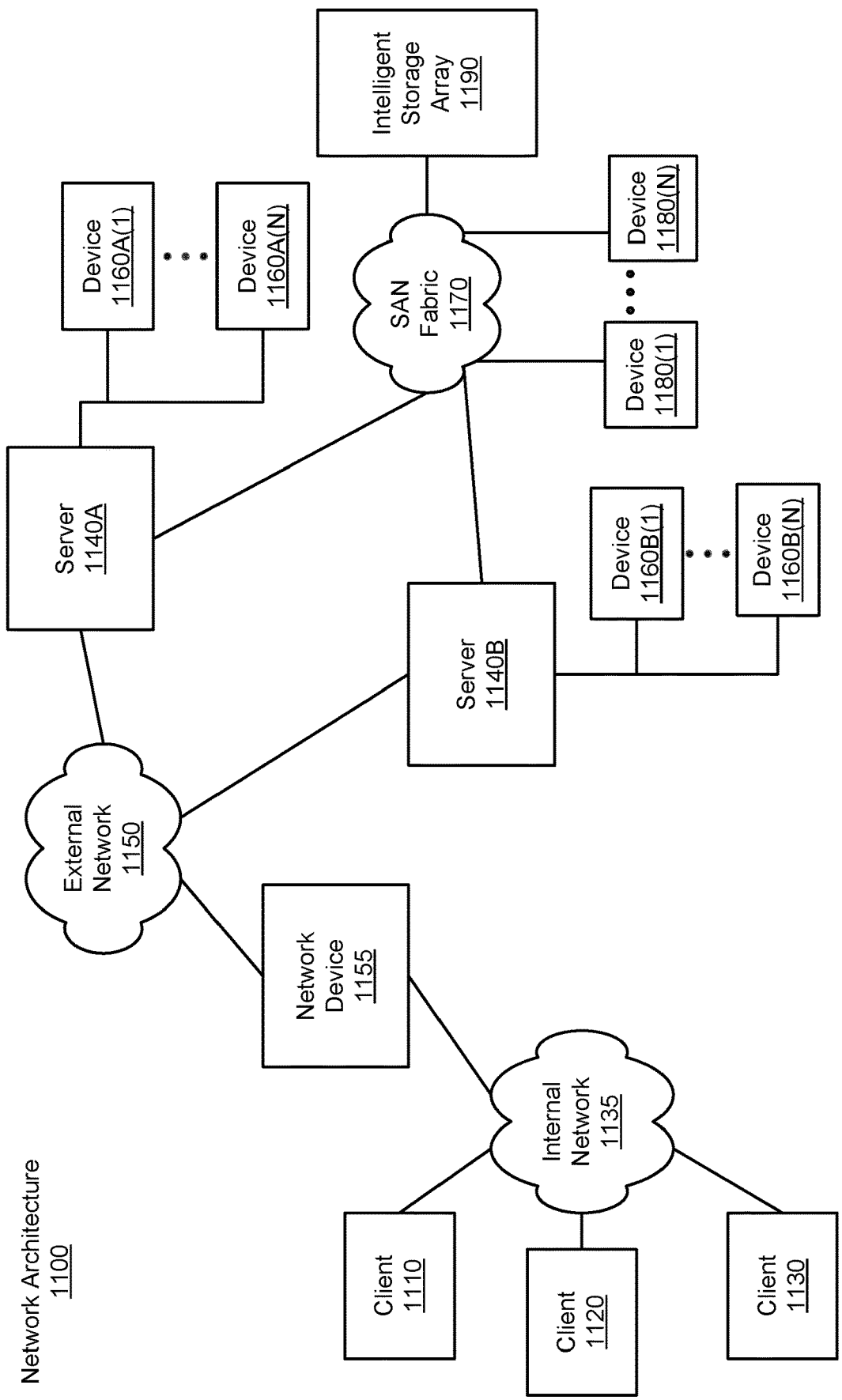
FIG. 11 is a simplified block diagram of a network architecture, in which embodiments such as those described herein can be implemented.

FIG. 11 is a block diagram depicting a network architecture 1100 in which client computer systems 1110, 1120 and 1130 are coupled to one another by an internal network 1135, as well as storage servers 1140A and 1140B (any of which can be implemented using computer system 1110), are coupled to an external network 1150. Internal network 1135 and external network 1150 are communicatively coupled to one another, in turn, by a network device 1155, in the manner of network device 110 and/or network device 404.

Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation. SAN fabric 1170 supports access to storage devices 1180(1)-(N) by storage servers 1140A and 1140B, and so by client systems 1110, 1120 and 1130 via external network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to external network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1010, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Example Networking Device

As shown above, the present disclosure can be implemented using a variety of computer systems and networks. An example of one such computing environment is described below with reference to FIG. 12.

Figure 12:
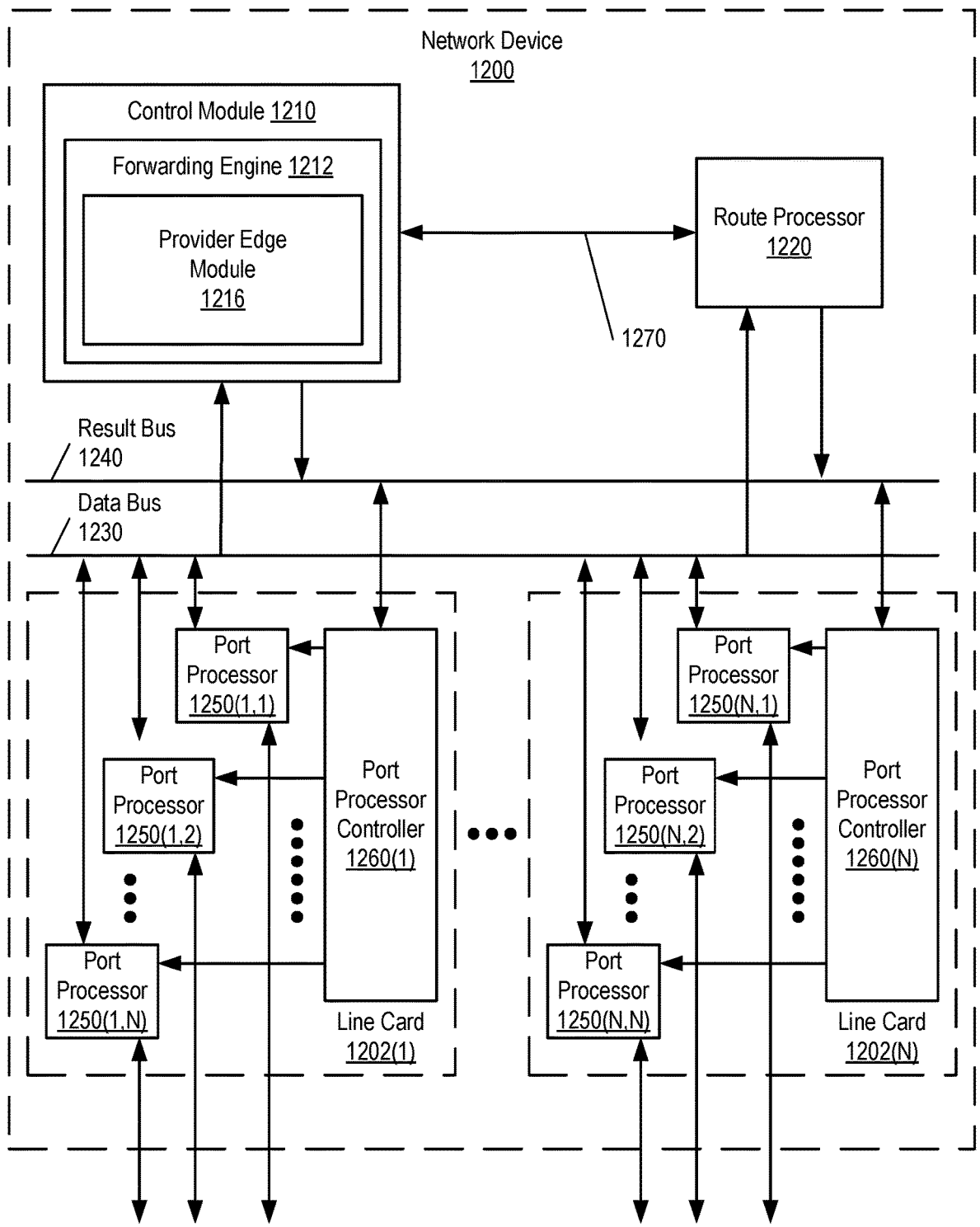
FIG. 12 is a block diagram illustrating components of an example networking device, which can be used in the implementation of embodiments such as those described herein.

FIG. 12 is a block diagram illustrating components of an example networking device 1200, which depicts (at least in part) one configuration of a network device or a network routing element (e.g., a router or similar device). As such, it will be appreciated that networking device 1200 supports certain networking protocols (e.g., such as those described herein, as well as, potentially, other networking protocols), which send information in units of network communications such as packets, datagrams, frames, and the like.

In the present depiction, networking device 1200 includes a number of line cards (line cards 1202(1)-1202(N)) that are communicatively coupled to a control module 1210 (which can be coupled to (or include a forwarding engine, such as forwarding engine 1212). Forwarding engine 1212, in turn, can be configured to effect protocols and methods such as those described herein. To that end, in order to perform operations such as those described in connection with FIGS. 4-11, for example, a core edge node's access network protocol module can be implemented. In fact, such an access network protocol can implement processes for both local and remote core edge node operations, allowing a core edge node to serve as a local core edge node for certain flows, while serving as a remote core edge node for others.

Networking device 1200 is also depicted as including a traffic control (or flow control) processor (depicted as a route processor 1220), to which line cards 1202(1)-1202(N) are also coupled. Line 1202(1)-1202(N) are coupled to control module 1210 and route processor 1220 via a data bus 1230 and a result bus 1240. Line cards 1202(1)-(N) include a number of port processors 1250(1,1)-1250(N,N) which are controlled by port processor controllers 1260(1)-1260(N). It will also be noted that control module 1210 and route processor 1220 are not only coupled to one another via data bus 1230 and result bus 1240, but are also communicatively coupled to one another by a communications link 1270. It is noted that in alternative embodiments, each line card can include its own forwarding engine. Further in this regard, forwarding engine 1212 and route processor 1220 can, in certain embodiments, be combined, and so are not necessarily the separate components of network device 1200 depicted in FIG. 12. Further still, forwarding engine 1212 and/or route processor 1220 can include a computer-readable storage medium (memory, (tertiary) content-addressable memory, solid state storage device(s), or the like) in which a network address table (storing network address information), such as a forwarding table (storing the aforementioned MAC addresses), can be maintained by a network device such as network device 1200 implementing a core edge node.

When a packet is received by a network device or network routing element such as networking device 1200, the packet can be identified and analyzed in the following manner Upon receipt, a packet (or some or all of its control information) is sent from one of the port processors 1250(1,1)-1250(N,N) at which the packet was received to one or more of those devices coupled to data bus 1230 (e.g., others of port processors 1250(1,1)-1250(N,N), a forwarding engine such as forwarding engine 1212, and/or route processor 1220). Handling of the packet can be performed, for example, by a forwarding engine in accordance with the systems and methods disclosed herein. For example, a forwarding engine may determine that the packet should be forwarded to one or more of port processors 1250(1,1)-1250(N,N). This can be accomplished by indicating to a corresponding one(s) of port processor controllers 1260(1)-1260(N) that the copy of the packet held in the given one(s) of port processors 1250(1,1)-1250(N,N) should be forwarded to the appropriate one of port processors 1250(1,1)-1250(N,N).

Networking device 1200 can be used, for example, in the implementation of a network device or a network routing element by way of control module 1210, or in one or more of port processor controllers 1260(1)-1260(N) and/or in route processor 1220, in order to implement the present disclosure. Although not shown, network device 1200 can also be used to implement a routing protocol module (not shown) and/or network reachability protocol module (not shown) in control module 1210, in one of port processor controllers 1260(1)-1260(N), and/or in route processor 1220. In so doing, a core edge node such as one of the core edge nodes described earlier can be implemented.

An incoming packet can be provided to a network device or network routing element via a forwarding engine or port processor of a line card coupled to a port that received the incoming packet. Network device 1200 can be configured to process the incoming packet and to generate one or more outgoing packets, as described throughout this disclosure.

The outgoing packet can be provided to a forwarding engine by a network device or a network routing device, which can determine that the outgoing packet should be forwarded to one or more of port processors 1250(1,1)-1250(N,N) that are configured to transmit the outgoing packet toward the outgoing packet's destination. As noted with regard to other systems described herein, networking device 1200 includes one or more processors (e.g., microprocessors, PLDs (Programmable Logic Devices), or ASICs (Application Specific Integrated Circuits)) configured to execute program instructions stored in computer readable storage media of various types, including RAM (Random Access Memory), ROM (Read Only Memory), Flash memory, MEMS (Micro Electro-Mechanical Systems) memory, and the like.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:
1. A method comprising:
   receiving a topology change message at a core edge node,
      wherein
         the core edge node is a member of a redundancy group comprising a plurality of core edge nodes, the core edge node is a designated forwarder of the redundancy group,
the core edge node participates in network communications with one or more access network nodes of an access network using an access network protocol,
the access network protocol is a Layer 2 gateway protocol,
the topology change message is received from an access network node of the one or more access network nodes,
the topology change message indicates that a topology change has occurred in the access network, and
the topology change message conforms to the Layer 2 gateway protocol; and
performing a network address information removal operation, wherein
the network address information removal operation removes network address information stored by the core edge node, and
the network address information is used by the core edge node in participating in the network communications.

2. The method of claim 1, wherein
a virtual local area network is multi-homed to the plurality of core edge nodes,
the virtual local area network comprises a plurality of flows,
the core edge node is the designated forwarder for a flow of the plurality of flows, and
each flow of the plurality of flows is active on only one of the plurality of core edge nodes.

3. The method of claim 1, further comprising:
advertising the network address information removal operation by sending an advertisement to at least one other core node of a plurality of core nodes in a core network, wherein
the plurality of core nodes comprise the core edge node,
the core edge node is comprised in a plurality of core edge nodes comprised in a redundancy group,
prior to the sending of the advertisement,
the core edge node was in communication with a remote core edge node of the plurality of core nodes in support of a flow, and
the core edge node and another core edge node of the plurality of core edge nodes were communicatively coupled to one another by a communication path; and
upon receiving a network communication from the remote core edge node subsequent to the sending of the advertisement, communicating the network communication to the another core edge node.

4. The method of claim 3, wherein the at least one other core node is a remote core edge node of the plurality of core nodes, and the method further comprises:
receiving the advertisement at the remote core edge node; and
in response to receipt of the advertisement by the remote core edge node, performing another network address information removal operation, wherein
the another network address information removal operation removes other network address information stored by the remote core edge node.

5. The method of claim 4, further comprising:
determining whether to flood one or more packets to the plurality of core edge nodes; and
in response to a determination to flood the one or more packets, flooding the one or more packets to the plurality of core edge nodes.

6. The method of claim 4, wherein
prior to receipt of the advertisement, the remote core edge node supported a flow by communicating with the core edge node,
the core edge node is comprised in a plurality of core edge nodes comprised in a redundancy group, and
the method further comprises
determining whether to use a multicast communications technique to support the flow, and
in response to a determination that the multicast communications technique should be used to support the flow, causing the remote core edge node to communicate with the plurality of core edge nodes using the multicast communications technique.

7. The method of claim 3, further comprising:
sending a configuration message to a remote core edge node of the plurality of core nodes;
receiving the configuration message at the remote core edge node; and
in response to receipt of the configuration message at the remote core edge node,
disabling aliasing,
disabling split-horizon filtering, and
disabling a backup route.

8. The method of claim 3, wherein the plurality of core nodes are comprised in a core network, the topology change message comprises topology change information, and the method further comprises:
in response to receipt of the topology change message,
determining whether topology change information is to be communicated to another core edge node, wherein
the core edge node and the another core edge node are comprised in a redundancy group, and
in response to a determination that the topology change information is to be communicated to the another core edge node, communicating the topology change information to the another core edge node.

9. The method of claim 1, further comprising:
determining whether the topology change has affected reachability of a computing device communicatively coupled to the access network, wherein
the reachability of the computing device is determined for a flow; and
in response to a determination that the topology change has affected reachability of the computing device, re-advertising route information for the flow.

10. The method of claim 1, wherein
the network address information is media access control address information,
the network address information removal operation is a media access control flush, the core edge node is an edge node of a core network, and
the core network supports an Ethernet virtual private network (EVPN) protocol by implementing a multi-protocol label switching (MPLS) protocol.

11. The method of claim 10, wherein
the network address information removal operation removes one or more network addresses from a forwarding table maintained by the core edge node.

12. The method of claim 1, wherein the core edge node is one of a plurality of core nodes in a core network, and the method further comprises:

identifying a plurality of core edge nodes of the plurality of core nodes as being members of a redundancy group, wherein the plurality of core edge nodes comprises the core edge node, the access network comprises a plurality of access network nodes, and each of the plurality of core edge nodes is communicatively coupled to one or more of the plurality of access network nodes; and configuring a communications path between the core edge node and another core edge node of the plurality of core edge nodes.

13. A network device comprising:

one or more processors, wherein the network device is a core edge node;

a first network interface, coupled to the one or more processors and configured to be coupled to an access network;

a second network interface, coupled to the one or more processors and configured to be coupled to a core network;

a memory, coupled to the one or more processors and configured to store network address information;

a computer-readable storage medium, coupled to the one or more processors; and a plurality of instructions, encoded in the computer-readable storage medium and configured to cause the one or more processors to receive a topology change message at the first network interface, wherein the core edge node is a member of a redundancy group comprising a plurality of core edge nodes, the core edge node is a designated forwarder of the redundancy group, the core edge node is configured to participate in network communications with one or more access network nodes of an access network using an access network protocol via the first network interface, the core edge node is configured to participate in other network communications with one or more core nodes of a core network using a core network protocol via the second network interface, the access network protocol is a Layer 2 gateway protocol, the topology change message is received from an access network node of the one or more access network nodes, the topology change message indicates that a topology change has occurred in the access network, and the topology change message conforms to the Layer 2 gateway protocol; and perform a network address information removal operation, wherein the network address information removal operation removes the network address information stored in the memory, and the network address information is used by the core edge node in participating in the network communications.

14. The network device of claim 13, wherein the core edge node is one of a plurality of core nodes in a core network, and the plurality of instructions are further configured to cause the one or more processors to:

advertise the network address information removal operation by sending an advertisement to at least one other core node of the plurality of core nodes, wherein prior to the advertisement being sent, the core edge node was in communication with a remote core edge node of the plurality of core nodes in support of a flow, and the core edge node and another core edge node of the plurality of core edge nodes were communicatively coupled to one another by a communication path; and upon receiving a network communication from the remote core edge node subsequent to the sending of the advertisement, communicate the network communication to the another core edge node.

15. The network device of claim 13, wherein the core edge node is one of a plurality of core nodes in a core network, the topology change message comprises topology change information, and the plurality of instructions are further configured to cause the one or more processors to:

in response to receipt of the topology change message, determine whether topology change information is to be communicated to another core edge node, wherein the core edge node and the another core edge node are comprised in a redundancy group, and in response to a determination that the topology change information is to be communicated to the another core edge node, communicate the topology change information to the another core edge node.

16. The network device of claim 13, wherein the plurality of instructions are further configured to cause the one or more processors to:

determine whether the topology change has affected reachability of a computing device communicatively coupled to the access network, wherein the reachability of the computing device is determined for a flow; and in response to a determination that the topology change has affected reachability of the computing device, re-advertise route information for the flow.

17. A computer program product comprising:

a plurality of instructions, comprising a first set of instructions, executable by a processor of a core edge node, configured to receive a topology change message, wherein the core edge node is a member of a redundancy group comprising a plurality of core edge nodes, the core edge node is a designated forwarder of the redundancy group, the core edge node is configured to participate in network communications with one or more access network nodes of an access network using an access network protocol, the access network protocol is a Layer 2 gateway protocol, the topology change message is received from an access network node of the one or more access network nodes, the topology change message indicates that a topology change has occurred in the access network, and the topology change message conforms to the access network protocol; and a second set of instructions, executable by the processor, configured to perform a network address information removal operation, wherein the network address information removal operation removes network address information stored in a memory of the core edge node, the memory and the processor are coupled to one another and the network address information is used by the core edge node in participating in the network communications; and a non-transitory computer-readable storage medium, wherein the instructions are encoded in the non-transitory computer-readable storage medium.

18. The computer program product of claim 17, wherein the core edge node is one of a plurality of core nodes in a core network, and the instructions further comprise:

a third set of instructions, executable by the processor, configured to advertise the network address information removal operation by sending an advertisement to at least one other core node of the plurality of core nodes, wherein prior to the advertisement being sent, the core edge node was in communication with a remote core edge node of the plurality of core nodes in support of a flow, and the core edge node and another core edge node of the plurality of core edge nodes were communicatively coupled to one another by a communication path; and a fourth set of instructions, executable by the processor, configured to, upon receiving a network communication from the remote core edge node subsequent to the sending of the advertisement, communicate the network communication to the another core edge node.

19. The computer program product of claim 17, wherein the core edge node is one of a plurality of core nodes in a core network, the topology change message comprises topology change information, and the instructions further comprise:

a third set of instructions, executable by the processor, configured to, in response to receipt of the topology change message, determine whether topology change information is to be communicated to another core edge node, wherein the core edge node and the another core edge node are comprised in a redundancy group, and in response to a determination that the topology change information is to be communicated to the another core edge node, communicate the topology change information to the another core edge node.

20. The computer program product of claim 17, wherein the instructions further comprise:

a third set of instructions, executable by the processor, configured to determine whether the topology change has affected reachability of a computing device communicatively coupled to the access network, wherein the reachability of the computing device is determined for a flow; and a fourth set of instructions, executable by the processor, configured to in response to a determination that the topology change has affected reachability of the computing device, re-advertise route information for the flow.

* * * * *